US010455563B2

(12) United States Patent
Xia et al.

(10) Patent No.: US 10,455,563 B2
(45) Date of Patent: Oct. 22, 2019

(54) METHOD, DEVICE, AND APPARATUS FOR DETERMINING DOWNLINK PARAMETER

(71) Applicant: Huawei Technologies Co., Ltd., Shenzhen (CN)

(72) Inventors: Liang Xia, Shenzhen (CN); Yuan Xia, Beijing (CN); Brian Classon, Palatine, IL (US); Vipul Desai, Rolling Meadows, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 61 days.

(21) Appl. No.: 15/217,793

(22) Filed: Jul. 22, 2016

(65) Prior Publication Data
US 2016/0338024 A1 Nov. 17, 2016

Related U.S. Application Data

(63) Continuation of application No. PCT/CN2014/071378, filed on Jan. 24, 2014.

(51) Int. Cl.
*H04W 72/04* (2009.01)
*H04L 1/00* (2006.01)
*H04L 27/34* (2006.01)

(52) U.S. Cl.
CPC ........ *H04W 72/042* (2013.01); *H04L 1/0003* (2013.01); *H04L 27/3494* (2013.01)

(58) Field of Classification Search
CPC . H04L 1/0003; H04L 27/3494; H04L 1/0009; H04L 1/1812; H04L 1/1819;
(Continued)

(56) References Cited

U.S. PATENT DOCUMENTS

2009/0201884 A1 8/2009 Chaponniere
2009/0213806 A1* 8/2009 Ode .................. H04W 8/22
370/329
(Continued)

FOREIGN PATENT DOCUMENTS

CN 1976535 A 6/2007
CN 102546124 A 7/2012
(Continued)

OTHER PUBLICATIONS

3GPP TS 36.212 V12.0.0 (Dec. 2013); 3rd Generation Partnership Project; Technical Specification Group Radio Access Network; Evolved Universal Terrestrial Radio Access (E-UTRA); Multiplexing and channel coding (Release 12); 88 pages.
(Continued)

*Primary Examiner* — Kan Yuen
(74) *Attorney, Agent, or Firm* — Slater Matsil, LLP

(57) ABSTRACT

Embodiments disclose a method, a device, and an apparatus for determining a downlink parameter. The method may include: receiving category information and modulation information that are reported by UE, where the category information includes a UE category of the UE, and the modulation information includes a highest order modulation scheme supported by the UE; and determining, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

15 Claims, 6 Drawing Sheets

(58) Field of Classification Search
CPC ............... H04L 1/1845; H04L 27/0008; H04L 27/0012; H04L 27/2627; H04L 27/3405; H04L 5/1453; H04W 72/042; H04W 84/042; H04B 7/0632

See application file for complete search history.

(56) References Cited

U.S. PATENT DOCUMENTS

| | | | |
|---|---|---|---|
| 2011/0039518 A1 | 2/2011 | Maria | |
| 2012/0087396 A1 | 4/2012 | Nimbalker et al. | |
| 2012/0322455 A1* | 12/2012 | Oh | H04W 72/048 455/450 |
| 2013/0176981 A1 | 7/2013 | Earnshaw et al. | |
| 2014/0045497 A1 | 2/2014 | Abe et al. | |
| 2014/0153511 A1* | 6/2014 | Sirotkin | H04W 48/06 370/329 |
| 2015/0372784 A1* | 12/2015 | Xu | H04L 27/36 370/329 |

FOREIGN PATENT DOCUMENTS

| | | |
|---|---|---|
| EP | 2667533 A1 | 11/2013 |
| JP | 2012248909 A | 12/2012 |
| JP | 2014502080 A | 1/2014 |
| JP | 2015513834 A | 5/2015 |
| JP | 2015514378 A | 5/2015 |
| RU | 2465742 C2 | 3/2012 |
| WO | 2009102270 A1 | 8/2009 |
| WO | 2010126899 A2 | 11/2010 |
| WO | 2012094241 A1 | 7/2012 |
| WO | 2013123961 A1 | 8/2013 |
| WO | 2013154276 A1 | 10/2013 |

OTHER PUBLICATIONS

3GPP TS 36.306 V11.4.0 (Sep. 2013); 3rd Generation Partnership Project; Technical Specification Group Radio Access Network; Evolved Universal Terrestrial Radio Access (E-UTRA); User Equipment (UE) radio access capabilities (Release 11); 27 pages.

3GPP TS 36.306 V11.5.0 (Dec. 2013); 3rd Generation Partnership Project; Technical Specification Group Radio Access Network; Evolved Universal Terrestrial Radio Access (E-UTRA); User Equipment (UE) radio access capabilities (Release 11); 29 pages.

Qualcomm Incorporated; "New UE Categories"; 3GPP TSB-RAN meeting #61; Porto, Portugal, Sep. 3-6, 2013; RP-131162; 4 pages.

3GPP Specification Releases; "LTE-Advanced"; Nov. 4, 2010; cited from "3GPP, PR-091005, Proposal for Candidate Radio Interface Technologies for IMT—Advanced Based on LTE Release 10 and Beyond"; 182 pages.

* cited by examiner

METHOD, DEVICE, AND APPARATUS FOR DETERMINING DOWNLINK PARAMETER

CROSS-REFERENCE TO RELATED APPLICATIONS

This application is a continuation of International Patent Application No. PCT/CN2014/071378, filed on Jan. 24, 2014, which is incorporated herein by reference in its entirety.

TECHNICAL FIELD

The present invention relates to the communications field, and in particular, to a method, a device, and an apparatus for determining a downlink parameter.

BACKGROUND

Multiple user equipment (UE) categories are defined in a current communications system. During communication, UE may report a UE category of the UE to a base station, and the base station then configures a downlink parameter for the UE according to the UE category, where the downlink parameter may include at least one of the following: a maximum number of bits that can be received within one transmission time interval (TTI), where the number of bits is a number of bits of data transmitted in a downlink shared channel (DL-SCH) transport block (the parameter is a first downlink parameter, where the parameter may be represented as: Maximum number of DL-SCH transport block bits received within a TTI), a maximum number of bits, which can be received within one TTI, of data transmitted in one DL-SCH transport block (the parameter is a second downlink parameter, where the parameter may be represented as: Maximum number of bits of a DL-SCH transport block received within a TTI), and a maximum number of bits of data transmitted on a soft channel (the parameter is a third downlink parameter, where the parameter may be represented as: total number of soft channel bits). In this way, it can be known by using the first downlink parameter how many bits of data can be received at most by the UE within one TTI, it can be known by using the second downlink parameter how many bits of data can be received at most by the UE within one TTI in one DL-SCH transport block, and it can be known by using the third downlink parameter how many bits of data can be received at most by the UE on a soft channel.

In a current Long Term Evolution (LTE) release, 64 quadrature amplitude modulation (QAM) is a highest order modulation scheme. However, in practice, to improve spectral efficiency, an order of a modulation scheme of data may also increase gradually, and a higher-order modulation scheme (for example, 256QAM) may be introduced for a base station. For example, when 256QAM is introduced for the base station, the downlink parameter is still determined only according to a UE category. In this way, when UEs supporting different highest order modulation schemes (for example, UE 1 supports a highest order modulation scheme of 64QAM, and UE 2 supports a highest order modulation scheme of 256QAM) exist in a same UE category, the base station can determine the downlink parameter only according to UE, which supports a lowest order in highest order modulation schemes, in the same UE category (for example, the downlink parameter is determined according to the UE 1 supporting a highest order modulation scheme of 64QAM). Therefore, a downlink parameter of UE that can originally support a 256QAM feature is not a downlink parameter determined according to a modulation scheme of 256QAM.

As a result, when the base station and the UE perform downlink transmission, the 256QAM feature cannot be introduced, causing a failure to improve spectral efficiency. It can be seen that, in the foregoing technology, a modulation feature of UE cannot be fully used during a process of downlink transmission and a feature of a highest order modulation scheme supported by the UE cannot be introduced in downlink transmission, which causes a problem that spectral efficiency in downlink transmission is not high.

SUMMARY

Embodiments provide a method for determining a downlink parameter, a base station, and UE, which can resolve a problem that spectral efficiency in downlink transmission is not high because a modulation feature of UE cannot be fully used during a process of downlink transmission and a feature of a highest order modulation scheme supported by the UE cannot be introduced in downlink transmission.

According to a first aspect, embodiments provide a base station, including a first receiving unit and a determining unit, where the first receiving unit is configured to receive category information and modulation information that are reported by user equipment UE, where the category information includes a UE category of the UE, and the modulation information includes a highest order modulation scheme supported by the UE, and the determining unit is configured to determine, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

In a first possible implementation manner of the first aspect, the modulation information includes at least one of the following: information used to represent whether the highest order modulation scheme supported by the UE is a target modulation scheme and a highest order modulation order of a downlink modulation scheme, where the target modulation scheme includes 256 quadrature amplitude modulation QAM or a modulation scheme whose order is higher than 64QAM.

With reference to any foregoing implementation manner of the first aspect, in a second possible implementation manner of the first aspect, the base station further includes: a second receiving unit, configured to receive layer number information that is reported by the UE and that is used to represent a maximum number, of layers for spatial multiplexing in downlink, supported by the UE, where the determining unit is configured to determine, as a downlink parameter of the UE, a downlink parameter that is of the UE and that corresponds to the UE category of the UE, the highest order modulation scheme supported by the UE, and the maximum number, of layers for spatial multiplexing in downlink, supported by the UE, where the downlink parameter of the UE is determined according to a correspondence from a UE category of the UE, a highest order modulation scheme supported by the UE, and a maximum number, of layers for spatial multiplexing in downlink, supported by the UE to a downlink parameter of the UE as well as the UE category of the UE, the highest order modulation scheme supported by the UE, and the maximum number, of layers for spatial multiplexing in downlink, supported by the UE.

With reference to any foregoing implementation manner of the first aspect, in a third possible implementation manner of the first aspect, the downlink parameter includes at least one of the following: a maximum number of bits that can be received by the UE within one transmission time interval TTI, where the number of bits is a number of bits of data transmitted in a downlink shared channel DL-SCH transport block, a maximum number of bits, which can be received by the UE within one TTI, of data transmitted in one DL-SCH transport block, a maximum number of bits of data transmitted on a soft channel, and a maximum number of resource blocks RBs that can be received by the UE.

With reference to the third possible implementation manner of the first aspect, in a fourth possible implementation manner of the first aspect, the base station further includes a calculation unit is configured to calculate a soft buffer size of the DL-SCH transport block according to the UE category of the UE, a downlink transmission mode, and the maximum number of bits of data transmitted on a soft channel, where the downlink transmission mode includes a transmission mode in which downlink transmission with the UE is performed.

With reference to the fourth possible implementation manner of the first aspect, in a fifth possible implementation manner of the first aspect, the calculation unit calculates the soft buffer size of the DL-SCH transport block by using the following formula:

$$N_{IR} = \left\lfloor \frac{N_{soft}}{K_C \cdot K_{MIMO} \cdot \min(M_{DL\_HARQ}, M_{limit})} \right\rfloor,$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $K_C$ is a positive real number, $K_{MIMO}$ is a natural number in a value range from 1 to 2, $M_{DL\_HARQ}$ is a maximum downlink hybrid automatic repeat request (HARQ) process number, $M_{limit}$ is a predefined positive real number, and $\min(M_{DL\_HARQ}, M_{limit})$ denotes taking a smaller value of $M_{DL\_HARQ}$ and $M_{limit}$; or the calculation unit calculates the soft buffer size of the DL-SCH transport block by using the following formula:

$$N_{IR} = \left\lfloor \frac{N_{soft}}{\alpha \cdot K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $\alpha$ is a predefined positive real number, $K_C$ is a positive real number, $K_{MIMO}$ is a natural number in a value range from 1 to 2, $M_{DL\_HARQ}$ is a maximum downlink HARQ process number, $M_{limit}$ is a predefined positive real number, and $\min(M_{DL\_HARQ}, M_{limit})$ denotes taking a smaller value of $M_{DL\_HARQ}$ and $M_{limit}$.

With reference to the third possible implementation manner of the first aspect, in a sixth possible implementation manner of the first aspect, the base station further includes: a third receiving unit, configured to receive a maximum number, of RBs that can be received by the UE when the target modulation scheme is used in downlink transmission, reported by the UE, and determine, according to the highest order modulation scheme supported by the UE and the received maximum number of RBs, a number of RBs allocated to the UE, so that the number of RBs allocated to the UE is less than or equal to the received maximum number of RB.

With reference to the third possible implementation manner or the fourth possible implementation manner or the fifth possible implementation manner or the sixth possible implementation manner of the first aspect, in a seventh possible implementation manner of the first aspect, the base station further includes: a sending unit, configured to send first configuration information and second configuration information to the UE, where the first configuration information is used to indicate the downlink transmission mode, and the second configuration information is used to indicate whether the target modulation scheme is supported when downlink transmission is performed with the UE, so that the UE calculates the soft buffer size of the DL-SCH transport block according to the UE category of the UE, the downlink transmission mode, the maximum number of bits of data transmitted on a soft channel, and whether the target modulation scheme is supported when downlink transmission is performed with the UE.

With reference to any foregoing implementation manner of the first aspect, in an eighth possible implementation manner of the first aspect, the base station further includes: an establishment unit, configured to establish a correspondence from a UE category and a highest order modulation scheme to a downlink parameter, and send the correspondence to the UE; or a fourth receiving unit, configured to receive a correspondence, sent by the UE, from a UE category and a highest order modulation scheme to a downlink parameter.

According to a second aspect, embodiments provide UE, including an acquiring unit and a determining unit, where the acquiring unit is configured to acquire category information and modulation information of the UE, where the category information includes a UE category of the UE, and the modulation information includes a highest order modulation scheme supported by the UE. The determining unit is configured to determine, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

In a first possible implementation manner of the second aspect, the UE further includes: a reporting unit, configured to report the category information and the modulation information to a base station, so that the base station determines, as a downlink parameter of the UE, a downlink parameter that corresponds to the UE category of the UE and the highest order modulation scheme supported by the UE, where the downlink parameter of the UE is determined according to the correspondence from a UE category of the UE and a highest order modulation scheme supported by the UE to a downlink parameter of the UE as well as the UE category of the UE and the highest order modulation scheme supported by the UE.

With reference to any foregoing implementation manner of the second aspect, in a second possible implementation manner of the second aspect, the modulation information includes at least one of the following: information used to represent whether the highest order modulation scheme supported by the UE is a target modulation scheme and a highest order modulation order of a downlink modulation scheme, where the target modulation scheme includes 256 quadrature amplitude modulation QAM or a modulation scheme whose order is higher than 64QAM.

With reference to any foregoing implementation manner of the second aspect, in a third possible implementation manner of the second aspect, the determining unit is configured to determine, as a downlink parameter of the UE, a downlink parameter that is of the UE and that corresponds to the UE category of the UE, the highest order modulation scheme supported by the UE, and the maximum number, of layers for spatial multiplexing in downlink, supported by the UE, where the downlink parameter of the UE is determined according to a correspondence from a UE category of the UE, a highest order modulation scheme supported by the UE, and a maximum number, of layers for spatial multiplexing in downlink, supported by the UE to a downlink parameter of the UE as well as the UE category of the UE, the highest order modulation scheme supported by the UE, and the maximum number, of layers for spatial multiplexing in downlink, supported by the UE.

With reference to any foregoing implementation manner of the second aspect, in a fourth possible implementation manner of the second aspect, the downlink parameter includes at least one of the following: a maximum number of bits that can be received by the UE within one transmission time interval TTI, where the number of bits is a number of bits of data transmitted in a downlink shared channel DL-SCH transport block, a maximum number of bits, which can be received by the UE within one TTI, of data transmitted in one DL-SCH transport block, a maximum number of bits of data transmitted on a soft channel, and a maximum number of RBs that can be received by the UE.

With reference to the fourth possible implementation manner of the second aspect, in a fifth possible implementation manner of the second aspect, the UE further includes: a first receiving unit, configured to receive first configuration information and second configuration information that are sent by the base station, where the first configuration information is used to indicate a downlink transmission mode, and the second configuration information is used to indicate whether the target modulation scheme is supported when downlink transmission is performed with the UE; and a calculation unit, configured to calculate a soft buffer size of the DL-SCH transport block according to the UE category of the UE, the downlink transmission mode, the maximum number of bits of data transmitted on a soft channel, and whether the target modulation scheme is supported when downlink transmission is performed with the UE, where the downlink transmission mode includes a transmission mode in which the base station and the UE perform downlink transmission, and the target modulation scheme includes 256 quadrature amplitude modulation QAM or a modulation scheme whose order is higher than 64QAM.

With reference to the fifth possible implementation manner of the second aspect, in a sixth possible implementation manner of the second aspect, the calculation unit calculates the soft buffer size of the DL-SCH transport block by using the following formula:

$$N_{IR} = \left\lfloor \frac{N_{soft}}{K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $K_C$ is a positive real number determined according to whether the target modulation scheme is supported in downlink transmission performed by the base station and the UE, $K_{MIMO}$ is a natural number in a value range from 1 to 2, $M_{DL\_HARQ}$ is a maximum downlink hybrid automatic repeat request HARQ process number, $M_{limit}$ is a predefined positive real number, and $\min(M_{DL\_HARQ}, M_{limit})$ denotes taking a smaller value of $M_{DL\_HARQ}$ and $M_{limit}$; or the calculation unit calculates the soft buffer size of the DL-SCH transport block by using the following formula:

$$N_{IR} = \left\lfloor \frac{N_{soft}}{\alpha \cdot K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $\alpha$ is a predefined positive real number, $K_C$ is a positive real number determined according to whether the target modulation scheme is supported in downlink transmission performed by the base station and the UE, $K_{MIMO}$ is a natural number in a value range from 1 to 2, $M_{DL\_HARQ}$ is a maximum downlink HARQ process number, $M_{limit}$ is a predefined positive real number, and $\min(M_{DL\_HARQ}, M_{limit})$ denotes taking a smaller value of $M_{DL\_HARQ}$ and $M_{limit}$.

With reference to any foregoing implementation manner of the second aspect, in a seventh possible implementation manner of the second aspect, the UE further includes: an establishment unit, configured to establish a correspondence from a UE category and a highest order modulation scheme to a downlink parameter, and send the correspondence to the base station; or a second receiving unit, configured to receive a correspondence, sent by the base station, from a UE category and a highest order modulation scheme to a downlink parameter.

According to a third aspect, embodiments provide an apparatus for determining a downlink parameter, including: a receiver, configured to receive category information and modulation information that are reported by user equipment UE, where the category information includes a UE category of the UE, and the modulation information includes a highest order modulation scheme supported by the UE; and a processor, configured to determine, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

In a first possible implementation manner of the third aspect, the modulation information includes at least one of the following: information used to represent whether the highest order modulation scheme supported by the UE is a target modulation scheme and a highest order modulation order of a downlink modulation scheme, where the target modulation scheme includes 256 quadrature amplitude modulation QAM or a modulation scheme whose order is higher than 64QAM.

With reference to any foregoing implementation manner of the third aspect, in a second possible implementation manner of the third aspect, the receiver is further configured to receive layer number information that is reported by the UE and that is used to represent a maximum number, of layers for spatial multiplexing in downlink, supported by the UE; and the processor is configured to determine, as a downlink parameter of the UE, a downlink parameter that is of the UE and that corresponds to the UE category of the UE, the highest order modulation scheme supported by the UE, and the maximum number, of layers for spatial multiplexing in downlink, supported by the UE, where the downlink parameter of the UE is determined according to a correspondence from a UE category of the UE, a highest order modulation scheme supported by the UE, and a maximum number, of layers for spatial multiplexing in downlink, supported by the UE to a downlink parameter of the UE as well as the UE category of the UE, the highest order modulation scheme supported by the UE, and the maximum number, of layers for spatial multiplexing in downlink, supported by the UE.

With reference to any foregoing implementation manner of the third aspect, in a third possible implementation manner of the third aspect, the downlink parameter includes at least one of the following: a maximum number of bits that can be received by the UE within one transmission time interval TTI, where the number of bits is a number of bits of data transmitted in a downlink shared channel DL-SCH transport block, a maximum number of bits, which can be received by the UE within one TTI, of data transmitted in one DL-SCH transport block, a maximum number of bits of data transmitted on a soft channel, and a maximum number of RBs that can be received by the UE.

With reference to the third possible implementation manner of the third aspect, in a fourth possible implementation manner of the third aspect, the processor is further configured to calculate a soft buffer size of the DL-SCH transport block according to the UE category of the UE, a downlink transmission mode, and the maximum number of bits of data transmitted on a soft channel, where the downlink transmission mode includes a transmission mode in which downlink transmission with the UE is performed.

With reference to the third possible implementation manner of the third aspect, in a fifth possible implementation manner of the third aspect, the receiver is further configured to receive a maximum number, of RBs that can be received by the UE when the target modulation scheme is used in downlink transmission, reported by the UE; and the processor is further configured to determine, according to the highest order modulation scheme supported by the UE and the received maximum number of RBs, a number of RBs allocated to the UE, so that the number of RBs allocated to the UE is less than or equal to the received maximum number of RB.

With reference to the third possible implementation manner or the fourth possible implementation manner or the fifth possible implementation manner of the third aspect, in a sixth possible implementation manner of the third aspect, the apparatus further includes a transmitter, where the transmitter is configured to send first configuration information and second configuration information to the UE, where the first configuration information is used to indicate the downlink transmission mode, and the second configuration information is used to indicate whether the target modulation scheme is supported when downlink transmission is performed with the UE, so that the UE calculates the soft buffer size of the DL-SCH transport block according to the UE category of the UE, the downlink transmission mode, the maximum number of bits of data transmitted on a soft channel, and whether the target modulation scheme is supported when downlink transmission is performed with the UE.

With reference to any foregoing implementation manner of the third aspect, in a seventh possible implementation manner of the third aspect, the apparatus further includes a transmitter, where the processor is further configured to establish a correspondence from a UE category and a highest order modulation scheme to a downlink parameter; and the transmitter is configured to send the correspondence to the UE; or the receiver is configured to receive a correspondence, sent by the UE, from a UE category and a highest order modulation scheme to a downlink parameter.

According to a fourth aspect, embodiments provide an apparatus for determining a downlink parameter, including: a processor, configured to acquire category information and modulation information of user equipment UE, where the category information includes a UE category of the UE, and the modulation information includes a highest order modulation scheme supported by the UE, where the processor is configured to determine, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

In a first possible implementation manner of the fourth aspect, the apparatus further includes a transmitter, where the transmitter is configured to report the category information and the modulation information to a base station, so that the base station determines, as a downlink parameter of the UE, a downlink parameter that corresponds to the UE category of the UE and the highest order modulation scheme supported by the UE, where the downlink parameter of the UE is determined according to the correspondence from a UE category of the UE and a highest order modulation scheme supported by the UE to a downlink parameter of the UE as well as the UE category of the UE and the highest order modulation scheme supported by the UE.

With reference to any foregoing implementation manner of the fourth aspect, in a second possible implementation manner of the fourth aspect, the modulation information includes at least one of the following: information used to represent whether the highest order modulation scheme supported by the UE is a target modulation scheme and a highest order modulation order of a downlink modulation scheme, where the target modulation scheme includes 256 quadrature amplitude modulation QAM or a modulation scheme whose order is higher than 64QAM.

With reference to any foregoing implementation manner of the fourth aspect, in a third possible implementation manner of the fourth aspect, the processor is further configured to determine, as a downlink parameter of the UE, a downlink parameter that is of the UE and that corresponds to the UE category of the UE, the highest order modulation scheme supported by the UE, and the maximum number, of layers for spatial multiplexing in downlink, supported by the UE, where the downlink parameter of the UE is determined according to a correspondence from a UE category of the UE, a highest order modulation scheme supported by the UE, and a maximum number, of layers for spatial multiplexing in downlink, supported by the UE to a downlink parameter of the UE as well as the UE category of the UE, the highest order modulation scheme supported by the UE, and the maximum number, of layers for spatial multiplexing in downlink, supported by the UE.

With reference to any foregoing implementation manner of the fourth aspect, in a fourth possible implementation manner of the fourth aspect, the downlink parameter includes at least one of the following: a maximum number of bits that can be received by the UE within one transmission time interval TTI, where the number of bits is a number of bits of data transmitted in a downlink shared channel DL-SCH transport block, a maximum number of bits, which can be received by the UE within one TTI, of data transmitted in one DL-SCH transport block, a maximum number of bits of data transmitted on a soft channel, and a maximum number of resource blocks RBs that can be received by the UE.

With reference to the fourth possible implementation manner of the fourth aspect, in a fifth possible implementation manner of the fourth aspect, the apparatus further includes a receiver, where the receiver is configured to receive first configuration information and second configuration information that are sent by the base station, where the first configuration information is used to indicate a downlink transmission mode, and the second configuration information is used to indicate whether the target modulation scheme is supported when downlink transmission is performed with the UE; and the processor is configured to calculate a soft buffer size of the DL-SCH transport block according to the UE category of the UE, the downlink transmission mode, the maximum number of bits of data transmitted on a soft channel, and whether the target modulation scheme is supported when downlink transmission is performed with the UE, where the downlink transmission mode includes a transmission mode in which the base station and the UE perform downlink transmission, and the target modulation scheme includes 256 quadrature amplitude modulation QAM or a modulation scheme whose order is higher than 64QAM.

With reference to any foregoing implementation manner of the fourth aspect, in a sixth possible implementation manner of the fourth aspect, the apparatus further includes a transmitter and a receiver, where the processor is further configured to establish a correspondence from a UE category and a highest order modulation scheme to a downlink parameter; and the transmitter is configured to send, to the base station, the correspondence established by the processor; or the receiver is configured to receive a correspondence, sent by the base station, from a UE category and a highest order modulation scheme to a downlink parameter.

According to a fifth aspect, embodiments provide a method for determining a downlink parameter, including: receiving category information and modulation information that are reported by user equipment UE, where the category information includes a UE category of the UE, and the modulation information includes a highest order modulation scheme supported by the UE; and determining, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

In a first possible implementation manner of the fifth aspect, the modulation information includes at least one of the following: information used to represent whether the highest order modulation scheme supported by the UE is a target modulation scheme and a highest order modulation order of a downlink modulation scheme, where the target modulation scheme includes 256 quadrature amplitude modulation QAM or a modulation scheme whose order is higher than 64QAM.

With reference to any foregoing implementation manner of the fifth aspect, in a second possible implementation manner of the fifth aspect, before the determining, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE, the method further includes: receiving layer number information that is reported by the UE and that is used to represent a maximum number, of layers for spatial multiplexing in downlink, supported by the UE; and the determining, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE includes: determining, as a downlink parameter of the UE, a downlink parameter that is of the UE and that corresponds to the UE category of the UE, the highest order modulation scheme supported by the UE, and the maximum number, of layers for spatial multiplexing in downlink, supported by the UE, where the downlink parameter of the UE is determined according to a correspondence from a UE category of the UE, a highest order modulation scheme supported by the UE, and a maximum number, of layers for spatial multiplexing in downlink, supported by the UE to a downlink parameter of the UE as well as the UE category of the UE, the highest order modulation scheme supported by the UE, and the maximum number, of layers for spatial multiplexing in downlink, supported by the UE.

With reference to any foregoing implementation manner of the fifth aspect, in a third possible implementation manner of the fifth aspect, the downlink parameter includes at least one of the following: a maximum number of bits that can be received by the UE within one transmission time interval TTI, where the number of bits is a number of bits of data transmitted in a downlink shared channel DL-SCH transport block, a maximum number of bits, which can be received by the UE within one TTI, of data transmitted in one DL-SCH transport block, a maximum number of bits of data transmitted on a soft channel, and a maximum number of resource blocks RBs that can be received by the UE.

With reference to any foregoing implementation manner of the fifth aspect, in a fourth possible implementation manner of the fifth aspect, after the determining, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE, the method further includes: calculating a soft buffer size of the DL-SCH transport block according to the UE category of the UE, a downlink transmission mode, and the maximum number of bits of data transmitted on a soft channel, where the downlink transmission mode includes a transmission mode in which downlink transmission with the UE is performed.

With reference to the fourth possible implementation manner of the fifth aspect, in a fifth possible implementation manner of the fifth aspect, the calculating a soft buffer size of the DL-SCH transport block according to the UE category of the UE, a downlink transmission mode, and the maximum number of bits of data transmitted on a soft channel includes: calculating the soft buffer size of the DL-SCH transport block by using the following formula:

$$N_{IR} = \left\lfloor \frac{N_{soft}}{K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $K_C$ is a positive real number, $K_{MIMO}$ is a natural number in a value range from 1 to 2, $M_{DL\_HARQ}$ is a maximum downlink hybrid automatic repeat request (HARQ) process number, $M_{limit}$ is a predefined positive real number, and $\min(M_{DL\_HARQ}, M_{limit})$ denotes taking a smaller value of $M_{DL\_HARQ}$ and $M_{limit}$; or calculating the soft buffer size of the DL-SCH transport block by using the following formula:

$$N_{IR} = \left\lfloor \frac{N_{soft}}{\alpha \cdot K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $\alpha$ is a predefined positive real number, $K_C$ is a positive real number, $K_{MIMO}$ is a natural number in a value range from 1 to 2, $M_{DL\_HARQ}$ is a maximum downlink HARQ process number, $M_{limit}$ is a predefined positive real number, and $\min(M_{DL\_HARQ}, M_{limit})$ denotes taking a smaller value of $M_{DL\_HARQ}$ and $M_{limit}$.

With reference to the third possible implementation manner of the fifth aspect, in a sixth possible implementation manner of the fifth aspect, the method further includes: receiving a maximum number, of RBs that can be received by the UE when the target modulation scheme is used in downlink transmission, reported by the UE, and determining, according to the highest order modulation scheme supported by the UE and the received maximum number of RBs, a number of RBs allocated to the UE, so that the number of RBs allocated to the UE is less than or equal to the received maximum number of RB.

With reference to the third possible implementation manner or the fourth possible implementation manner or the fifth possible implementation manner or the sixth possible implementation manner of the fifth aspect, in a seventh possible implementation manner of the fifth aspect, after the determining, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE, the method further includes: sending first configuration information and second configuration information to the UE, where the first configuration information is used to indicate the downlink transmission mode, and the second configuration information is used to indicate whether the target modulation scheme is supported when downlink transmission is performed with the UE, so that the soft buffer size of the DL-SCH transport block is calculated according to the UE category of the UE, the downlink transmission mode, the maximum number of bits of data transmitted on a soft channel, and whether the target modulation scheme is supported when downlink transmission is performed with the UE.

With reference to any foregoing implementation manner of the fifth aspect, in an eighth possible implementation manner of the fifth aspect, the method further includes:

establishing a correspondence from a UE category and a highest order modulation scheme to a downlink parameter, and sending the correspondence to the UE; or receiving a correspondence, sent by the UE, from a UE category and a highest order modulation scheme to a downlink parameter.

According to a sixth aspect, embodiments provide a method for determining a downlink parameter, including: acquiring category information and modulation information of user equipment UE, where the category information includes a UE category of the UE, and the modulation information includes a highest order modulation scheme supported by the UE; and determining, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

In a first possible implementation manner of the sixth aspect, the method further includes: reporting the category information and the modulation information to a base station, so that the base station determines, as a downlink parameter of the UE, a downlink parameter that corresponds to the UE category of the UE and the highest order modulation scheme supported by the UE, where the downlink parameter of the UE is determined according to the correspondence from a UE category of the UE and a highest order modulation scheme supported by the UE to a downlink parameter of the UE as well as the UE category of the UE and the highest order modulation scheme supported by the UE.

With reference to any foregoing implementation manner of the sixth aspect, in a second possible implementation manner of the sixth aspect, the modulation information includes at least one of the following: information used to represent whether the highest order modulation scheme supported by the UE is a target modulation scheme and a highest order modulation order of a downlink modulation scheme, where the target modulation scheme includes 256 quadrature amplitude modulation QAM or a modulation scheme whose order is higher than 64QAM.

With reference to any foregoing implementation manner of the sixth aspect, in a third possible implementation manner of the sixth aspect, the determining, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE includes: determining, as a downlink parameter of the UE, a downlink parameter that is of the UE and that corresponds to the UE category of the UE, the highest order modulation scheme supported by the UE, and the maximum number, of layers for spatial multiplexing in downlink, supported by the UE, where the downlink parameter of the UE is determined according to a correspondence from a UE category of the UE, a highest order modulation scheme supported by the UE, and a maximum number, of layers for spatial multiplexing in downlink, supported by the UE to a downlink parameter of the UE as well as the UE category of the UE, the highest order modulation scheme supported by the UE, and the maximum number, of layers for spatial multiplexing in downlink, supported by the UE.

With reference to any foregoing implementation manner of the sixth aspect, in a fourth possible implementation manner of the sixth aspect, the downlink parameter includes at least one of the following: a maximum number of bits that can be received by the UE within one transmission time interval TTI, where the number of bits is a number of bits of data transmitted in a downlink shared channel DL-SCH transport block, a maximum number of bits, which can be received by the UE within one TTI, of data transmitted in one DL-SCH transport block, a maximum number of bits of data transmitted on a soft channel, and a maximum number of resource blocks RBs that can be received by the UE.

With reference to the fourth possible implementation manner of the sixth aspect, in a fifth possible implementation manner of the sixth aspect, after the reporting the category information and the modulation information to a base station, the method further includes: receiving first configuration information and second configuration information that are sent by the base station, where the first configuration information is used to indicate a downlink transmission mode, and the second configuration information is used to indicate whether the target modulation scheme is supported when downlink transmission is performed with the UE; and calculating a soft buffer size of the DL-SCH transport block according to the UE category of the UE, the downlink transmission mode, the maximum number of bits of data transmitted on a soft channel, and whether the target modulation scheme is supported when downlink transmission is performed with the UE, where the downlink transmission mode includes a transmission mode in which the base station and the UE perform downlink transmission, and the target modulation scheme includes 256 quadrature amplitude modulation QAM or a modulation scheme whose order is higher than 64QAM.

With reference to the fifth possible implementation manner of the sixth aspect, in a sixth possible implementation manner of the sixth aspect, the calculating a soft buffer size of the DL-SCH transport block according to the UE category of the UE, the downlink transmission mode, the maximum number of bits of data transmitted on a soft channel, and whether the target modulation scheme is supported when downlink transmission is performed with the UE includes: calculating the soft buffer size of the DL-SCH transport block by using the following formula:

$$N_{IR} = \left\lfloor \frac{N_{soft}}{K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $K_C$ is a positive real number determined according to whether the target modulation scheme is supported in downlink transmission performed by the base station and the UE, $K_{MIMO}$ is a natural number in a value range from 1 to 2, $M_{DL\_HARQ}$ is a maximum downlink hybrid automatic repeat request HARQ process number, $M_{limit}$ is a predefined positive real number, and $\min(M_{DL\_HARQ}, M_{limit})$ denotes taking a smaller value of $M_{DL\_HARQ}$ and $M_{limit}$; or calculating the soft buffer size of the DL-SCH transport block by using the following formula:

$$N_{IR} = \left\lfloor \frac{N_{soft}}{\alpha \cdot K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $\alpha$ is a predefined positive real number, $K_C$ is a positive real number determined according to whether the target modulation scheme is supported in downlink transmission performed by the base station and the UE, $K_{MIMO}$ is a natural number in a value range from 1 to 2, $M_{DL\_HARQ}$ is a maximum downlink HARQ process number, $M_{limit}$ is a predefined positive real number, and $\min(M_{DL\_HARQ}, M_{limit})$ denotes taking a smaller value of $M_{DL\_HARQ}$ and $M_{limit}$.

With reference to any foregoing implementation manner of the sixth aspect, in a seventh possible implementation manner of the sixth aspect, the method further includes: establishing a correspondence from a UE category and a highest order modulation scheme to a downlink parameter, and sending the correspondence to the base station; or receiving a correspondence, sent by the base station, from a UE category and a highest order modulation scheme to a downlink parameter.

In the foregoing technical solutions, category information and modulation information that are reported by UE are received, where the category information includes a UE category of the UE, and the modulation information includes a highest order modulation scheme supported by the UE; and according to a correspondence from a UE category of the UE and a highest order modulation scheme supported by the UE to a downlink parameter of the UE as well as the UE category of the UE and the highest order modulation scheme supported by the UE, a downlink parameter that corresponds to the UE category of the UE and the highest order modulation scheme supported by the UE is then determined as a downlink parameter of the UE. In this way, it can be implemented that after UE supports a higher modulation scheme, a downlink parameter of the UE can be determined according to the higher modulation scheme, and the higher modulation scheme can be introduced during downlink transmission, so that it can be implemented that a modulation feature of the UE is fully used during a process of downlink transmission. In addition, because a feature of a highest order modulation scheme supported by the UE can be introduced in downlink transmission, spectral efficiency in downlink transmission can be improved.

BRIEF DESCRIPTION OF THE DRAWINGS

To describe the technical solutions in the embodiments more clearly, the following briefly introduces the accompanying drawings required for describing the embodiments. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments with reference to the accompanying drawings in the embodiments. Apparently, the described embodiments are merely some but not all of the embodiments. All other embodiments obtained by a person of ordinary skill in the art based on the embodiments without creative efforts shall fall within the protection scope of embodiments.

Figure 1:
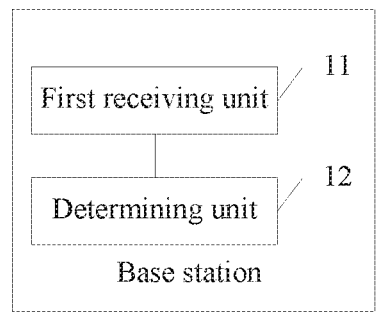
FIG. 1 is a schematic structural diagram of a base station according to an embodiment.

Referring to FIG. 1, FIG. 1 is a schematic structural diagram of a base station according to an embodiment. As shown in FIG. 1, the base station includes: a first receiving unit 11 and a determining unit 12.

The first receiving unit 11 is configured to receive category information and modulation information that are reported by UE, where the category information includes a UE category of the UE, and the modulation information includes a highest order modulation scheme supported by the UE.

Optionally, the UE category of the UE is not limited in this embodiment. For example, the UE category of the UE may be any one of 8 UE categories that are defined in an LTE release 10 system (LTE Rel-10 for short). In addition, apart from the 8 UE categories, the UE category of the UE may be also a UE category defined in another system (for example, an LTE release 11 system, and an LTE release 12 system) than the LTE release 10 system (LTE Rel-10 for short).

Optionally, the highest order modulation scheme supported by the UE is not limited. For example, the highest order modulation scheme supported by the UE may be 64QAM, 256QAM, a modulation scheme whose order is higher than 64QAM, or the like.

The determining unit 12 is configured to determine, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

Optionally, the correspondence may include correspondences of multiple UE categories, where a correspondence of each UE category is a correspondence from the UE category and at least one highest order modulation scheme to at least one downlink parameter. For example, a highest order modulation scheme supported in a UE category 1 may include 64QAM and 256QAM; in this case, the correspondence may include a correspondence from the UE category 1 and a supported highest order modulation scheme of 64QAM to a downlink parameter 1, and further include a correspondence from the UE category 1 and a supported highest order modulation scheme of 256QAM to a downlink parameter 2. In this way, when the UE category of the UE is the UE category 1, and the highest order modulation scheme supported by the UE is 256QAM, the determining unit 12 may determine that the downlink parameter 2 is the downlink parameter of the UE.

Optionally, the UE category included in the category information may be one or more UE categories; in this case, the determining unit 12 may determine one or more downlink parameters for the UE, where each downlink parameter corresponds to one UE category.

In the foregoing technical solution, category information and modulation information that are reported by UE are received, where the category information includes a UE category of the UE, and the modulation information includes a highest order modulation scheme supported by the UE; and according to a correspondence from a UE category of the UE and a highest order modulation scheme supported by the UE to a downlink parameter of the UE as well as the UE category of the UE and the highest order modulation scheme supported by the UE, a downlink parameter that corresponds to the UE category of the UE and the highest order modulation scheme supported by the UE is then determined as a downlink parameter of the UE. In this way, it can be implemented that after UE supports a higher modulation scheme, a downlink parameter of the UE can be determined according to the higher modulation scheme, and the higher modulation scheme can be introduced during downlink transmission, so that it can be implemented that a modulation feature of the UE is fully used during a process of downlink transmission. In addition, because a feature of a highest order modulation scheme supported by the UE can be introduced in downlink transmission, spectral efficiency in downlink transmission can be improved.

Figure 2:
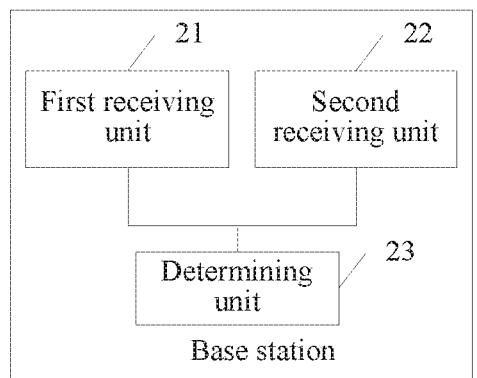
FIG. 2 is a schematic structural diagram of another base station according to an embodiment.

Referring to FIG. 2, FIG. 2 is a schematic structural diagram of another base station according to an embodiment. As shown in FIG. 2, the base station includes: a first receiving unit 21, a second receiving unit 22, and a determining unit 23.

The first receiving unit 21 is configured to receive category information and modulation information that are reported by user equipment UE, where the category information includes a UE category of the UE, and the modulation information includes a highest order modulation scheme supported by the UE.

Optionally, the modulation information may include at least one of the following: information used to represent whether the highest order modulation scheme supported by the UE is a target modulation scheme and a highest order modulation order of a downlink modulation scheme, where the target modulation scheme includes 256 QAM or a modulation scheme whose order is higher than 64QAM.

Optionally, in this embodiment, when the information represents that the highest order modulation scheme supported by the UE is not the target modulation scheme, in a method, it may be further determined that the highest order modulation scheme supported by the UE is a candidate modulation scheme, where the candidate modulation scheme is a modulation scheme whose modulation order is lower than that of the target modulation scheme. For example, the target modulation scheme is 256QAM, and the candidate modulation scheme may then be 64QAM.

The second receiving unit 22 is configured to receive layer number information that is reported by the UE and that is used to represent a maximum number, of layers for spatial multiplexing in downlink, supported by the UE (for example, maximum number of supported layers for spatial multiplexing in DL).

Optionally, the layer number information may be proactively reported by the UE, or after the UE receives a request message, the layer number information may be reported according to the request message.

The determining unit 23 is configured to determine, as a downlink parameter of the UE, a downlink parameter that is of the UE and that corresponds to the UE category of the UE, the highest order modulation scheme supported by the UE, and the maximum number, of layers for spatial multiplexing in downlink, supported by the UE, where the downlink parameter of the UE is determined according to a correspondence from a UE category of the UE, a highest order modulation scheme supported by the UE, and a maximum number, of layers for spatial multiplexing in downlink, supported by the UE to a downlink parameter of the UE as well as the UE category of the UE, the highest order modulation scheme supported by the UE, and the maximum number, of layers for spatial multiplexing in downlink, supported by the UE.

Optionally, the correspondence may be represented in a form of a table; in this way, when the UE category of the UE, the highest order modulation scheme supported by the UE, and the maximum number, of layers for spatial multiplexing in downlink, supported by the UE are determined, the downlink parameter may be directly found from the table.

Optionally, the correspondence may include correspondences listed in Table 1 to Table 6.2.

TABLE 1

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category 1 | 10296 | 10296 | 250368 | 1 | Yes or no |
| Category 2 | 51024 | 51024 | 1237248 | 2 | Yes or no |
| Category 3 | 102048 | 75376 | 1237248 | 2 | Yes or no |
| Category 4 | 150752 | 75376 | 1827072 | 2 | Yes or no |
| Category 5 | 299552 | 149776 | 3667200 | 4 | Yes or no |
| Category 6 | 301504 | 149776 (4 layers) 75376 (2 layers) | 3654144 | 2 or 4 | Yes or no |
| Category 7 | 301504 | 149776 (4 layers) 75376 (2 layers) | 3654144 | 2 or 4 | Yes or no |

Optionally, because a highest order modulation order of a downlink modulation scheme is in a one-to-one correspondence with a supported highest order modulation scheme, in a method, the highest order modulation scheme supported by the UE may be directly obtained when the modulation information is the highest order modulation order of the downlink modulation scheme. For example, when the highest order modulation order of the downlink modulation scheme is 8, the highest order modulation scheme supported by the UE is then 256QAM; when the highest order modulation order of the downlink modulation scheme is 6, the highest order modulation scheme supported by the UE is then 64QAM.

In the column of "Maximum number of bits, which can be received within one TTI, of data transmitted in one DL-SCH transport block", "149776 (4 layers)" represents that when the maximum number of layers for spatial multiplexing in downlink is four, a maximum number of bits, which can be received within one TTI, of data transmitted in one DL-SCH transport block in Category 6 is 149776; and "75376 (2 layers)" represents that when the maximum number of layers for spatial multiplexing in downlink is 2, a maximum number of bits, which can be received within one TTI, of data transmitted in one DL-SCH transport block in Category 6 is 75376. In addition, regardless of whether the highest order modulation scheme supported by the UE is the target modulation scheme (that is, "the target modulation scheme is supported" in Table 1) or the highest order modulation scheme supported by the UE is not the target modulation scheme (that is, "the target modulation scheme is not supported" in Table 1), downlink parameters determined by the determining unit 23 are the same.

It may be implemented according to Table 1 that, when the UE category reported by the UE is a UE category of Category 1 to Category 7, a downlink parameter of the UE may be determined according to the UE category and the supported highest order modulation scheme. In this way, it may be implemented that when the UE supports 256QAM or a modulation scheme whose order is higher than 64QAM, a feature of 256QAM or a modulation scheme whose order is higher than 64QAM may be introduced when the base station and the UE perform downlink transmission, so as to improve spectral efficiency.

TABLE 2.1

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
| --- | --- | --- | --- | --- | --- |
| Category 8 | 2998560 | 299856 | 35982720 | 8 | Yes or no |

TABLE 2.2

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
| --- | --- | --- | --- | --- | --- |
| Category 8 | 2998560 | 299856 | 35982720 | 8 | Yes |

It may be implemented according to Tables 2.1 and 2.2 that, when the UE category reported by the UE is the UE category of Category 8, a downlink parameter of the UE may be determined according to the UE category and the supported highest order modulation scheme. In this way, it may be implemented that, when the UE supports 256QAM or a modulation scheme whose order is higher than 64QAM, a feature of 256QAM or a modulation scheme whose order is higher than 64QAM may be introduced when the base station and the UE perform downlink transmission, so as to improve spectral efficiency.

TABLE 3.1

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
| --- | --- | --- | --- | --- | --- |
| Category A | 301504 | N2 (4 layers, and the target modulation scheme is supported) N1 (2 layers, and the target modulation scheme is supported) | 3654144 | 2 or 4 | Yes or no |

TABLE 3.1-continued

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| | | 149776 (4 layers, and the target modulation scheme is not supported) 75376 (2 layers, and the target modulation scheme is not supported) | | | |

It may be determined according to Table 3.1 that, for UE whose UE category is Category A, a maximum number of bits that can be received by the UE within one TTI is 301504, and a maximum number of bits of data transmitted on a soft channel is 3654144. If the maximum number, of layers for spatial multiplexing in downlink, supported by the UE is four, and the UE supports 256QAM or a modulation scheme whose order is higher than 64QAM, it may be determined that a maximum number of bits that can be received by the UE within one TTI in one DL-SCH transport block is N2. If the maximum number, of layers for spatial multiplexing in downlink, supported by the UE is two, and the UE supports 256QAM or a modulation scheme whose order is higher than 64QAM, it may be determined that a maximum number of bits that can be received by the UE within one TTI in one DL-SCH transport block is N1. If the maximum number, of layers for spatial multiplexing in downlink, supported by the UE is four, and the UE does not support 256QAM or a modulation scheme whose order is higher than 64QAM, it may be determined that a maximum number of bits that can be received by the UE within one TTI in one DL-SCH transport block is 149776. If the maximum number, of layers for spatial multiplexing in downlink, supported by the UE is two, and the UE does not support 256QAM or a modulation scheme whose order is higher than 64QAM, it may be determined that a maximum number of bits that can be received by the UE within one TTI in one DL-SCH transport block is 75376. N1 and N2 are respectively predefined maximum transport block sizes (TBS) that is of one layer and two layers and that can be supported in 256QAM, N1 may be an integer greater than 75376, and N2 may be an integer greater than 149776. For example, N1=101840, and N2=203704; N1=97896, and N2=195816; N1=105528, and N2=211936; or N1=93800, and N2=187712. Values of N1 and N2 mentioned below are the same as those herein, and details are not described again.

TABLE 3.2

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category A | 301504 | N2 (4 layers) N1 (2 layers) | 3654144 | 2 or 4 | Yes |

TABLE 3.3

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category A | 301504 | N2 (4 layers) N1 (2 layers) | 3654144 | 2 or 4 | Yes or no |

It may be determined according to Table 3.2 or Table 3.3 that, for the UE 1 whose UE category is Category A, a maximum number of bits that can be received by the UE within one TTI in one DL-SCH transport block is 301504, and a maximum number of bits of data transmitted on a soft channel is 3654144. If the maximum number, of layers for spatial multiplexing in downlink, supported by the UE is four, it may be determined that a maximum number of bits that can be received by the UE within one TTI in one DL-SCH transport block is N2. If the maximum number, of layers for spatial multiplexing in downlink, supported by the UE is two, it may be determined that a maximum number of bits that can be received by the UE within one TTI in one DL-SCH transport block is N1.

Table 3.2 is used only when the highest order modulation scheme supported by the UE is the target modulation scheme. In Table 3.3, regardless of whether the highest order modulation scheme supported by the UE is the target modulation scheme (that is, "the target modulation scheme is supported" in Table 1) or the highest order modulation scheme supported by the UE is not the target modulation scheme (that is, "the target modulation scheme is not supported" in Table 1), downlink parameters determined in step 203 are the same.

TABLE 3.4

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category A | 301504 | 149776 (4 layers, and the target modulation scheme is supported; 4 layers, and the target modulation scheme is not supported; or 2 layers, and the target modulation scheme is supported) 75376 (2 layers, and the target modulation scheme is not supported) | 3654144 | 2 or 4 | Yes or no |

It may be determined according to the foregoing table that, a maximum number of bits that can be received by the UE within one TTI is 301504, and a maximum number of bits of data transmitted on a soft channel is 3654144. If the maximum number, of layers for spatial multiplexing in downlink, supported by the UE is four, it may be determined that a maximum number of bits that can be received by the UE within one TTI in one DL-SCH transport block is 149776. If the maximum number, of layers for spatial multiplexing in downlink, supported by the UE is two, and the UE supports 256QAM or a modulation scheme whose order is higher than 64QAM, it may be determined that a maximum number of bits that can be received by the UE within one TTI in one DL-SCH transport block is 149776. If the maximum number, of layers for spatial multiplexing in downlink, supported by the UE is two, and the UE does not support 256QAM or a modulation scheme whose order is higher than 64QAM, it may be determined that a maximum number of bits that can be received by the UE within one TTI in one DL-SCH transport block is 75376.

TABLE 3.5

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category A | 301504 | N2 (4 layers, and the target modulation scheme is supported) 149776 (4 layers, and the target modulation scheme is not supported; or 2 layers, and the target modulation scheme is supported) 75376 (2 layers, and the target modulation scheme is not supported) | 3654144 | 2 or 4 | Yes or no |

It may be determined according to the foregoing table that, a maximum number of bits that can be received by the UE within one TTI is 301504, and a maximum number of bits of data transmitted on a soft channel is 3654144. If the maximum number, of layers for spatial multiplexing in downlink, supported by the UE is four, and the UE supports 256QAM or a modulation scheme whose order is higher than 64QAM, it may be determined that a maximum number of bits that can be received by the UE within one TTI in one DL-SCH transport block is N2. If the maximum number, of layers for spatial multiplexing in downlink, supported by the UE is four, and the UE does not support 256QAM or a modulation scheme whose order is higher than 64QAM, it may be determined that a maximum number of bits that can be received by the UE within one TTI in one DL-SCH transport block is 149776. If the maximum number, of layers for spatial multiplexing in downlink, supported by the UE is two, and the UE supports 256QAM or a modulation scheme whose order is higher than 64QAM, it may be determined that a maximum number of bits that can be received by the UE within one TTI in one DL-SCH transport block is 149776. If the maximum number, of layers for spatial multiplexing in downlink, supported by the UE is two, and the UE does not support 256QAM or a modulation scheme whose order is higher than 64QAM, it may be determined that a maximum number of bits that can be received by the UE within one TTI in one DL-SCH transport block is 75376.

It may be determined according to the foregoing table that, for the UE 1 whose UE category is Category A, a maximum number of bits that can be received by the UE within one TTI is 301504, a maximum number of bits of data transmitted on a soft channel is 3654144, and it is determined that a maximum number of bits that can be received by the UE within one TTI in one DL-SCH transport block is 149776.

It may be implemented according to Table 3 to Table 3.6 and by means of the method that a maximum downlink transmission rate that can be supported is about 300 Mbps (megabits per second) (that is, 301504 bits (bit)/1 ms (millisecond)=301.504 Mbps, where 1 TTI=1 ms). When the UE whose UE category is Category A can support 256QAM or a modulation scheme whose order is higher than 64QAM, assuming that the UE supports one carrier and a number, of layers for spatial multiplexing in downlink, supported by the UE is two, a downlink transmission rate that the UE can reach is about 200 Mbps (that is, N1 bit*2/1 ms=203.68 Mbps), where * in this embodiment represents a multiplication operation.

In addition, it may be implemented according to Table 3 to Table 3.6 and by means of the method that, the UE category being Category A is similar to the UE category being Category 6 or Category 7 defined in LTE Rel-10 and

TABLE 3.6

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category A | 301504 | 149776 | 3654144 | 2 or 4 | Yes |

Rel-11. Therefore, in the method, without changing a maximum number of bits of data transmitted on a soft channel of Category 6 and Category 7 defined in LTE Rel-10 and Rel-11, it may be implemented that, the UE can support 256QAM or a modulation scheme whose order is higher than 64QAM; and when there is one carrier and a number of layers for spatial multiplexing in downlink is two, the UE can reach a downlink peak transmission rate.

multiplexing in downlink, supported by the UE is two, and the UE supports 256QAM or a modulation scheme whose order is higher than 64QAM, the base station determines that a maximum number of bits that can be received by the UE within one TTI in one DL-SCH transport block is N1. If the maximum number, of layers for spatial multiplexing in downlink, supported by the UE is four, and the UE does not

TABLE 4.1

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category B | 452256 | N2 (4 layers, and the target modulation scheme is supported) N1 (2 layers, and the target modulation scheme is supported) 149776 (4 layers, and the target modulation scheme is not supported) 75376 (2 layers, and the target modulation scheme is not supported) | 5481216 | 2 or 4 | Yes or no |

It may be determined according to Table 4.1 that, for UE whose UE category is Category B, a maximum number of bits that can be received by the UE within one TTI is 452256, and a maximum number of bits of data transmitted on a soft channel is 5481216. If the maximum number, of layers for spatial multiplexing in downlink, supported by the UE is four, and the UE supports 256QAM or a modulation scheme whose order is higher than 64QAM, the base station determines that a maximum number of bits that can be received by the UE within one TTI in one DL-SCH transport block is N2. If the maximum number, of layers for spatial support 256QAM or a modulation scheme whose order is higher than 64QAM, the base station determines that a maximum number of bits that can be received by the UE within one TTI in one DL-SCH transport block is 149776. If the maximum number, of layers for spatial multiplexing in downlink, supported by the UE is two, and the UE does not support 256QAM or a modulation scheme whose order is higher than 64QAM, the base station determines that a maximum number of bits that can be received by the UE within one TTI in one DL-SCH transport block is 75376.

TABLE 4.2

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category B | 452256 | N2 (4 layers) N1 (2 layers) | 5481216 | 2 or 4 | Yes |

TABLE 4.3

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category B | 452256 | N2 (4 layers) N1 (2 layers) | 5481216 | 2 or 4 | Yes or no |

It may be determined according to Table 4.2 or Table 4.3 that, for UE whose UE category is Category B, a maximum number of bits that can be received by the UE within one TTI is 452256, and a maximum number of bits of data transmitted on a soft channel is 5481216. If the maximum number, of layers for spatial multiplexing in downlink, supported by the UE is four, the base station determines that a maximum number of bits that can be received by the UE within one TTI in one DL-SCH transport block is N2. If the maximum number, of layers for spatial multiplexing in downlink, supported by the UE is two, the base station determines that a maximum number of bits that can be received by the UE within one TTI in one DL-SCH transport block is N1.

Table 4.2 is used only when the highest order modulation scheme supported by the UE is the target modulation scheme. In Table 4.3, regardless of whether the highest order modulation scheme supported by the UE is the target modulation scheme (that is, "the target modulation scheme is supported" in Table 1) or the highest order modulation scheme supported by the UE is not the target modulation scheme (that is, "the target modulation scheme is not sup- ported" in Table 1), downlink parameters determined in step 203 are the same.

TABLE 4.4

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category B | 452256 | 149776 (4 layers, and the target modulation scheme is supported; 4 layers, and the target modulation scheme is not supported; or 2 layers, and the target modulation scheme is supported) 75376 (2 layers, and the target modulation scheme is not supported) | 5481216 | 2 or 4 | Yes or no |

It may be determined according to Table 4.4 that, for UE whose UE category is Category B, a maximum number of bits that can be received by the UE within one TTI is 452256, and a maximum number of bits of data transmitted on a soft channel is 5481216. If the maximum number, of layers for spatial multiplexing in downlink, supported by the UE is four, the base station determines that a maximum number of bits that can be received by the UE within one TTI in one DL-SCH transport block is 149776. If the maximum number, of layers for spatial multiplexing in downlink, supported by the UE is two, and the UE supports 256QAM or a modulation scheme whose order is higher than 64QAM, the base station determines that a maximum number of bits that can be received by the UE within one TTI in one DL-SCH transport block is 149776. If the maximum number, of layers for spatial multiplexing in downlink, supported by the UE is two, and the UE does not support 256QAM or a modulation scheme whose order is higher than 64QAM, the base station determines that a maximum number of bits that can be received by the UE within one TTI in one DL-SCH transport block is 75376.

TABLE 4.5

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category B | 452256 | N2 (4 layers, and the target modulation scheme is supported) 149776 (4 layers, and the target modulation scheme is not supported; or 2 layers, and the target modulation scheme is supported) 75376 (2 layers, and the target modulation scheme is not supported) | 5481216 | 2 or 4 | Yes or no |

It may be determined according to the foregoing table that, a maximum number of bits that can be received by the UE within one TTI is 452256, and a maximum number of bits of data transmitted on a soft channel is 5481216. If the maximum number, of layers for spatial multiplexing in downlink, supported by the UE is four, and the UE supports 256QAM or a modulation scheme whose order is higher than 64QAM, it may be determined that a maximum number of bits that can be received by the UE within one TTI in one DL-SCH transport block is N2. If the maximum number, of layers for spatial multiplexing in downlink, supported by the UE is four, and the UE does not support 256QAM or a modulation scheme whose order is higher than 64QAM, it may be determined that a maximum number of bits that can be received by the UE within one TTI in one DL-SCH transport block is 149776. If the maximum number, of layers for spatial multiplexing in downlink, supported by the UE is two, and the UE supports 256QAM or a modulation scheme whose order is higher than 64QAM, it may be determined that a maximum number of bits that can be received by the UE within one TTI in one DL-SCH transport block is 149776. If the maximum number, of layers for spatial multiplexing in downlink, supported by the UE is two, and the UE does not support 256QAM or a modulation scheme whose order is higher than 64QAM, it may be determined that a maximum number of bits that can be received by the UE within one TTI in one DL-SCH transport block is 75376.

TABLE 4.6

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category B | 452256 | 149776 | 5481216 | 2 or 4 | Yes |

It may be determined according to Table 4.6 that, for UE whose UE category is Category B, a maximum number of bits that can be received by the UE within one TTI is 452256, a maximum number of bits of data transmitted on a soft channel is 5481216, and it is determined that a maximum number of bits that can be received by the UE within one TTI in one DL-SCH transport block is 149776.

In the method, according to Table 4 to Table 4.6, a maximum downlink transmission rate that can be supported is about 450 Mbps (that is, 452256 bit/1 ms=452.256 Mbps, where 1 TTI=1 ms). When the UE can support 256QAM or a modulation scheme whose order is higher than 64QAM, assuming that the UE supports two carriers and a number, of layers for spatial multiplexing in downlink, supported by the UE is two, a downlink transmission rate that the UE can reach is about 400 Mbps (that is, N1 bit*2*2/1 ms=407.36 Mbps). When the UE can support 256QAM or a modulation scheme whose order is higher than 64QAM, assuming that the UE supports one carrier and a number, of layers for spatial multiplexing in downlink, supported by the UE is four, a downlink transmission rate that the UE can reach is about 400 Mbps (that is, N2 bit*2/1 ms=407.408 Mbps).

When the UE can support 256QAM or a modulation scheme whose order is higher than 64QAM, assuming that the UE supports three carriers and a number of layers for spatial multiplexing in downlink, supported by the UE is two, a downlink transmission rate that the UE can reach is about 450 Mbps (that is, 75376 bit*2*3/1 ms=452.256 Mbps).

By means of the method, the UE can support 256QAM or a modulation scheme whose order is higher than 64QAM, and when there are two carriers and a number of layers for spatial multiplexing in downlink is two, the UE can reach a downlink peak transmission rate; or when there is one carrier, and a number of layers for spatial multiplexing in downlink is four, the UE can reach a downlink peak transmission rate.

support 256QAM or a modulation scheme whose order is higher than 64QAM, the base station determines that a maximum number of bits that can be received by the UE within one TTI in one DL-SCH transport block is 75376.

A value of M1 may be max(2*N1, N2), where max(2*N1, N2) denotes taking a larger value of two values 2*N1 and N2, and a value of S1 may be 12*M1. Specifically, when N1=101840, and N2=203704, M1=203704, and S1=2467584; when N1=97896, and N2=195816, M1=195816, and S1=2371584; when N1=105528, and N2=211936, M1=211936, and S1=2567040; or when N1=93800, and N2=187712, M1=187712, and S1=2273664. In this case, a downlink peak rate that can be reached by the UE in Category C is about 200 Mbps.

TABLE 5.1

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category C | M1 | N2 (4 layers, and the target modulation scheme is supported) N1 (2 layers, and the target modulation scheme is supported) 149776 (4 layers, and the target modulation scheme is not supported) 75376 (2 layers, and the target modulation scheme is not supported) | S1 | 2 or 4 | Yes or no |

It may be determined according to Table 5.1 that, for UE whose UE category is Category C, a maximum number of bits that can be received by the UE within one TTI is M1, and a maximum number of bits of data transmitted on a soft channel is S1. If the maximum number, of layers for spatial multiplexing in downlink, supported by the UE is four, and the UE supports 256QAM or a modulation scheme whose order is higher than 64QAM, the base station determines that a maximum number of bits that can be received by the UE within one TTI in one DL-SCH transport block is N2. If the maximum number, of layers for spatial multiplexing in downlink, supported by the UE is two, and the UE supports 256QAM or a modulation scheme whose order is higher than 64QAM, the base station determines that a maximum number of bits that can be received by the UE within one TTI in one DL-SCH transport block is N1. If the maximum number, of layers for spatial multiplexing in downlink, supported by the UE is four, and the UE does not support 256QAM or a modulation scheme whose order is higher than 64QAM, the base station determines that a maximum number of bits that can be received by the UE within one TTI in one DL-SCH transport block is 149776. If the maximum number of layers for spatial multiplexing in downlink, supported by the UE is two, and the UE does not Alternatively, a value of M1 may be max(4*N1, 2*N2), and a value of S1 may be 12*M1. Specifically, when N1=101840, and N2=203704, M1=407408, and S1=4935168; when N1=97896, and N2=195816, M1=391632, and S1=4743168; when N1=105528, and N2=211936, M1=423872, and S1=5134080; or when N1=93800, and N2=187712, M1=375424, and S1=4547328. In this case, a downlink peak rate that can be reached by the UE in Category C is about 400 Mbps.

Alternatively, a value of M1 may be max(6*N1, 3*N2, 75376*8, 149776*4), and a value of S1 may be 12*M1. Specifically, when N1=101840, and N2=203704, M1=611112, and S1=7402752; when N1=97896, and N2=195816, M1=587448, and S1=7114752; when N1=105528, and N2=211936, M1=635808, and S1=7701120; or when N1=93800, and N2=187712, M1=563136, and S1=6820992. In this case, a downlink peak rate that can be reached by the UE in Category C is about 600 Mbps.

Alternatively, a value of M1 may be max(8*N1, 4*N2), and a value of S1 may be 12*M1. Specifically, when N1=101840, and N2=203704, M1=814816, and S1=9870336; when N1=97896, and N2=195816, M1=783264, and S1=9486336; when N1=105528, and N2=211936, M1=847744, and S1=10268160; or when N1=93800, and N2=187712, M1=750848, and S1=9094656. In this case, a downlink peak rate that can be reached by the UE in Category C is about 800 Mbps.

Alternatively, a value of M1 may be max(10*N1, 5*N2), and a value of S1 may be 12*M1. Specifically, when N1=101840, and N2=203704, M1=1018520, and S1=12337920; when N1=97896, and N2=195816, M1=979080, and S1=11857920; when N1=105528, and N2=211936, M1=1059680, and S1=12835200; or when N1=93800, and N2=187712, M1=938560, and S1=11368320. In this case, a downlink peak rate that can be reached by the UE in Category C is about 1000 Mbps.

TABLE 5.2

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category C | M2 | N2 (4 layers)<br>N1 (2 layers) | S2 | 2 or 4 | Yes |

TABLE 5.3

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category C | M2 | N2 (4 layers)<br>N1 (2 layers) | S2 | 2 or 4 | Yes or no |

It may be determined according to Table 5.2 or Table 5.3 that, for UE whose UE category is Category C, a maximum number of bits that can be received by the UE within one TTI is M2, and a maximum number of bits of data transmitted on a soft channel is S2. If the maximum number, of layers for spatial multiplexing in downlink, supported by the UE is four, the base station determines that a maximum number of bits that can be received by the UE within one TTI in one DL-SCH transport block is N2. If the maximum number, of layers for spatial multiplexing in downlink, supported by the UE is two, the base station determines that a maximum number of bits that can be received by the UE within one TTI in one DL-SCH transport block is N1.

Methods for determining values of M2 and S2 are respectively the same as methods for determining values of M1 and S1, and details are not described herein again.

Table 5.2 is used only when the highest order modulation scheme supported by the UE is the target modulation scheme. In Table 5.3, regardless of whether the highest order modulation scheme supported by the UE is the target modulation scheme (that is, "the target modulation scheme is supported" in Table 1) or the highest order modulation scheme supported by the UE is not the target modulation scheme (that is, "the target modulation scheme is not supported" in Table 1), downlink parameters determined in step 203 are the same.

TABLE 5.4

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category C | M3 | 149776 (4 layers, and the target modulation scheme is supported; 4 layers, and the target modulation scheme is not supported; or 2 layers, and the target modulation scheme is supported) 75376 (2 layers, and the target modulation scheme is not supported) | S3 | 2 or 4 | Yes or no |

It may be determined according to Table 5.4 that, for UE whose UE category is Category C, a maximum number of bits that can be received by the UE within one TTI is M3, and a maximum number of bits of data transmitted on a soft channel is S3. If the maximum number, of layers for spatial multiplexing in downlink, supported by the UE is four, the base station determines that a maximum number of bits that can be received by the UE within one TTI in one DL-SCH transport block is 149776. If the maximum number, of layers for spatial multiplexing in downlink, supported by the UE is two, and the UE supports 256QAM or a modulation scheme whose order is higher than 64QAM, the base station determines that a maximum number of bits that can be received by the UE within one TTI in one DL-SCH transport block is 149776. If the maximum number, of layers for spatial multiplexing in downlink, supported by the UE is two, and the UE does not support 256QAM or a modulation scheme whose order is higher than 64QAM, the base station determines that a maximum number of bits that can be received by the UE within one TTI in one DL-SCH transport block is 75376.

A value of M3 may be 75376*8=603008, and a value of S3 may be 7308288; in this case, a downlink peak rate that can be reached by the UE in Category C is about 600 Mbps. Alternatively, a value of M3 may be 75376*10=753760, and a value of S3 is 9135360; in this case, a downlink peak rate that can be reached by the UE in Category C is about 750 Mbps. Alternatively, a value of M3 may be 149776*6=898656, and a value of S3 is 10886400; in this case, a downlink peak rate that can be reached by the UE in Category C is about 900 Mbps. Alternatively, a value of M3 may be 149776*8=1198208, and a value of S3 is 14515200; in this case, a downlink peak rate that can be reached by the UE in Category C is about 1200 Mbps. Alternatively, a value of M3 is 149776*10=1497760, and a value of S3 is 18144000; in this case, a downlink peak rate that can be reached by the UE in Category C is about 1500 Mbps. Specifically, M3 and S3 may be set to different values according to a data characteristic of downlink transmission performed with the UE.

TABLE 5.5

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category C | M4 | N2 (4 layers, and the target modulation scheme is supported) 149776 (4 layers, and the target modulation scheme is not | S4 | 2 or 4 | Yes or no |

TABLE 5.5-continued

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| | | supported; or 2 layers, and the target modulation scheme is supported) 75376 (2 layers, and the target modulation scheme is not supported) | | | |

It may be determined according to the foregoing table that a maximum number of bits that can be received by the UE within one TTI is M4, and a maximum number of bits of data transmitted on a soft channel is S4. If the maximum number, of layers for spatial multiplexing in downlink, supported by the UE is four, and the UE supports 256QAM or a modulation scheme whose order is higher than 64QAM, it may be determined that a maximum number of bits that can be received by the UE within one TTI in one DL-SCH transport block is N2. If the maximum number, of layers for spatial multiplexing in downlink, supported by the UE is four, and the UE does not support 256QAM or a modulation scheme whose order is higher than 64QAM, it may be determined that a maximum number of bits that can be received by the UE within one TTI in one DL-SCH transport block is 149776. If the maximum number, of layers for spatial multiplexing in downlink, supported by the UE is two, and the UE supports 256QAM or a modulation scheme whose order is higher than 64QAM, it may be determined that a maximum number of bits that can be received by the UE within one TTI in one DL-SCH transport block is 149776. If the maximum number, of layers for spatial multiplexing in downlink, supported by the UE is two, and the UE does not support 256QAM or a modulation scheme whose order is higher than 64QAM, it may be determined that a maximum number of bits that can be received by the UE within one TTI in one DL-SCH transport block is 75376.

TABLE 5.6

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category C | M4 | N3 | S4 | 2 or 4 | Yes |

It may be determined according to Table 5.6 that, for UE whose UE category is Category C, a maximum number of bits that can be received by the UE within one TTI is M4, a maximum number of bits of data transmitted on a soft channel is S4, and it is determined that a maximum number of bits that can be received by the UE within one TTI in one DL-SCH transport block is N3.

Optionally, methods for determining values of M4 and S4 are respectively the same as methods for determining values of M1 and S1; or methods for determining values of M4 and S4 are respectively the same as methods for determining values of M3 and S3; or values of M4 and S4 may be numeric values at corresponding positions in Table 2 to Table 4. Details are not described herein again. A value of N3 may be N2, N1, 149776, or 75376.

TABLE 5.7

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category C | M5 | N4 | S5 | 2 or 4 | Yes or no |

It may be determined according to Table 5.7 that, for UE whose UE category is Category C, a maximum number of bits that can be received by the UE within one TTI is M5, a maximum number of bits of data transmitted on a soft channel is S5, and it is determined that a maximum number of bits that can be received by the UE within one TTI in one DL-SCH transport block is N4.

Optionally, methods for determining values of M5 and S5 are respectively the same as methods for determining values of M1 and S1; or methods for determining values of M5 and S5 are respectively the same as methods for determining values of M3 and S3; or values of M5 and S5 may be numeric values at corresponding positions in Table 2 to Table 4. Details are not described herein again. A value of N4 may be N2, N1, 149776, or 75376.

TABLE 6.1

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category D | M6 | N5 | S6 | 8 | Yes |

TABLE 6.2

| UE category | Maximum number of bits that can be received within one TTI, where the number of bits is a number of bits of data transmitted in a DL-SCH transport block | Maximum number of bits, which can be received within one TTI, of data transmitted in one DL-SCH transport block | Maximum number of bits of data transmitted on a soft channel | Maximum number of layers for spatial multiplexing in downlink | Whether the target modulation scheme is supported |
|---|---|---|---|---|---|
| Category D | M6 | N5 | S6 | 8 | Yes or no |

It may be determined according to Tables 6 and 6.2 that, for UE whose UE category is Category C, a maximum number of bits that can be received by the UE within one TTI is M6, a maximum number of bits of data transmitted on a soft channel is S6, and it is determined that a maximum number of bits that can be received by the UE within one TTI in one DL-SCH transport block is N5.

N5 may be a maximum TBS that is of 5 layers and that can be supported in 256QAM. M6=10*N5, and S6 is about 12*M6. Specific values may be: N5=403896, M6=4038960, and S6=48467520; N5=405728, M6=4057280, and S6=48687360; N5=391656, M6=3916560, and S6=46998720; N5=422256, M6=4222560, and S6=50670720; N5=397776, M6=3977760, and S6=47733120; or N5=375448, M6=3754480, and S6=45053760.

Optionally, Category A, Category B, Category C, and Category D may be UE categories defined in a release (for example, a release such as LTE Rel-12, LTE Rel-13, and LTE Rel-14) later than LTE Rel-11. Category A, Category B, Category C, and Category D are only code names, which are not limited to names of the UE categories defined in a release (for example, a release such as LTE Rel-12, LTE Rel-13, and LTE Rel-14) later than LTE Rel-11.

Optionally, because Category A, Category B, Category C, and Category D are not defined in the releases LTE Rel-10 and LTE Rel-11, in this way, when the category information reported by the UE includes Category A, Category B, or Category C, the category information may further include Category 6 or Category 7, and when the category information reported by the UE includes Category D, the category information may further include Category 8, so that the UE category of the UE can be identified in LTE Rel-10 and LTE Rel-11 systems, and a downlink parameter is determined for the UE. That is, a downlink parameter corresponding to Category 6 or Category 7 may be used as a downlink parameter corresponding to Category A, Category B, or Category C, or a downlink parameter corresponding to Category 8 may be used as a downlink parameter corresponding to Category D.

Optionally, because Category A, Category B, Category C, and Category D are not defined in releases LTE Rel-8 and LTE Rel-9, in this way, when the category information reported by the UE includes Category A, Category B, or Category C, the category information may further include Category 4, and when the category information reported by the UE includes Category D, the category information may further include Category 5, so that the UE category of the UE can be identified in LTE Rel-8 and LTE Rel-9 systems, and a downlink parameter is determined for the UE. That is, a downlink parameter corresponding to Category 4 may be used as a downlink parameter corresponding to Category A, Category B, or Category C, or a downlink parameter corresponding to Category 5 may be used as a downlink parameter corresponding to Category D.

Optionally, the downlink parameter may include at least one of the following: a maximum number of bits that can be received by the UE within one transmission time interval TTI, where the number of bits is a number of bits of data transmitted in a downlink shared channel DL-SCH transport block, a maximum number of bits, which can be received by the UE within one TTI, of data transmitted in one DL-SCH transport block, a maximum number of bits of data transmitted on a soft channel, and a maximum number of resource blocks RBs that can be received by the UE.

Figure 3:
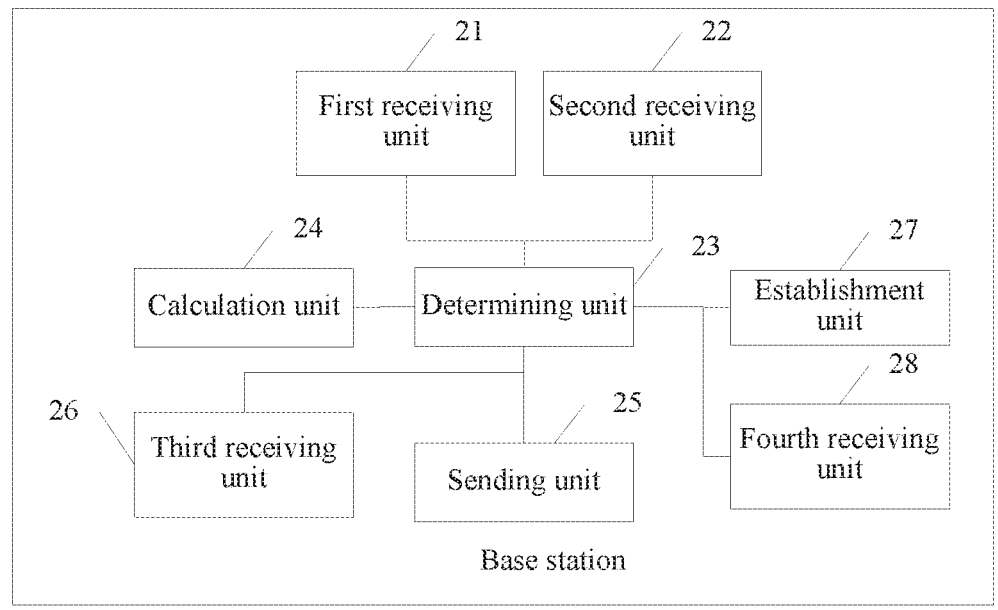
FIG. 3 is a schematic structural diagram of another base station according to an embodiment.

Optionally, as shown in FIG. 3, the base station may further include: a calculation unit 24, configured to calculate a soft buffer size of the DL-SCH transport block according to the UE category of the UE, a downlink transmission mode, and the maximum number of bits of data transmitted on a soft channel, where the downlink transmission mode includes a transmission mode in which downlink transmission with the UE is performed.

In the implementation manner, after the soft buffer size of the DL-SCH transport block is calculated, corresponding downlink transmission may be performed according to the soft buffer size of the DL-SCH transport block, so as to avoid a data loss caused when downlink data transmitted in the DL-SCH transport block exceeds the soft buffer size. In addition, in the method, a soft buffer size of a code block may be further determined, so as to perform bit collection on the code block according to the soft buffer size of the code block.

Optionally, the calculation unit 24 may calculate the soft buffer size of the DL-SCH transport block by using the following formula:

$$N_{IR} = \left\lfloor \frac{N_{soft}}{K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $K_C$ is a positive real number, $K_{MIMO}$ is a natural number in a value range from 1 to 2, $M_{DL\_HARQ}$ is a maximum downlink hybrid automatic repeat request (HARQ) process number, $M_{limit}$ is a predefined positive real number, and $\min(M_{DL\_HARQ}, M_{limit})$ denotes taking a smaller value of $M_{DL\_HARQ}$ and $M_{limit}$.

Optionally, when the category information represents one or more UE categories, the downlink parameter determined in step 203 may include one or more downlink parameters, and each downlink parameter includes a maximum number of bits of data transmitted on one soft channel. In this way, the determining unit 23 may determine a maximum number of bits of data transmitted on one or more soft channels. When the category information represents one UE category, the determining unit 23 determines a maximum number of bits of data transmitted only on one soft channel, where $N_{soft}$ is the maximum number of bits of data transmitted on a soft channel. When the category information represents multiple UE categories, the determining unit 23 may be further configured to determine one UE category from the multiple UE categories according to the UE categories of the UE and the downlink transmission mode and/or whether the target modulation scheme is supported in downlink transmission, and the determining unit 23 further determines, according to the determined UE category, a maximum number of bits of data transmitted on one soft channel, where $N_{soft}$ is the maximum number of bits of data transmitted on a soft channel. For example, the downlink transmission mode is a transmission mode 9 or a transmission mode 10, and the UE category reported by the UE includes Category 6, Category 7, or Category 8, so that a maximum number, of bits of data transmitted on a soft channel, corresponding to Category 6, Category 7, or Category 8 may be used as $N_{soft}$. For example, the downlink transmission mode is a transmission mode 11 (a transmission mode newly introduced in LTE Rel-12), and the UE category reported by the UE includes Category A, Category B, Category C, or Category D;

accordingly, a maximum number, of bits of data transmitted on a soft channel, corresponding to Category A, Category B, Category C, or Category D may be used as $N_{soft}$. The target modulation scheme is supported in downlink transmission, and the UE category reported by the UE includes Category A, Category B, Category C, or Category D; accordingly, a maximum number, of bits of data transmitted on a soft channel, corresponding to Category A, Category B, Category C, or Category D may be used as $N_{soft}$. When the downlink transmission mode is a transmission mode 11 (a transmission mode newly introduced in LTE Rel-12), and the UE category reported by the UE does not include Category A, Category B, Category C, or Category D, for example, the UE category reported by the UE includes a UE category of Category 1 to Category 5, a maximum number, of bits of data transmitted on a soft channel, corresponding to a UE category of Category 1 to Category 5 may be used as $N_{soft}$. For example, $N_{soft}$ may also be not determined according to the downlink transmission mode. For example, the UE category reported by the UE includes Category A, Category B, Category C or Category D, and accordingly, a maximum number, of bits of data transmitted on a soft channel, corresponding to Category A, Category B, Category C, or Category D may be used as $N_{soft}$. For example, the downlink transmission mode is the transmission mode 9 or 10, and the UE category reported by the UE includes Category 6, Category 7, or Category 8; accordingly, a maximum number, of bits of data transmitted on a soft channel, corresponding to Category 6, Category 7, or Category 8 may be used as $N_{soft}$. When the UE category reported by the UE does not include Category A, Category B, Category C, Category D, Category 6, Category 7, or Category 8, a maximum number, of bits of data transmitted on a soft channel, corresponding to a UE category of Category 1 to Category 5 may also be used as $N_{soft}$.

Optionally, if the target modulation scheme is supported in downlink transmission, and the UE category reported by the UE includes Category A, Category B, Category C, or Category D, accordingly, a maximum number, of bits of data transmitted on a soft channel, corresponding to Category A, Category B, Category C, or Category D may be used as $N_{soft}$. Otherwise, if the downlink transmission mode is a transmission mode 9 or a transmission mode 10, and the UE category reported by the UE includes Category 6, Category 7, or Category 8, a maximum number, of bits of data transmitted on a soft channel, corresponding to Category 6, Category 7, or Category 8 may be used as $N_{soft}$. Otherwise, a maximum number, of bits of data transmitted on a soft channel, corresponding to a UE category of Category 1 to Category 5 is used as $N_{soft}$.

Optionally, when $N_{soft}$ is a maximum soft channel corresponding to a UE category of Category 1 to Category 5, it is determined that Kc=1. When $N_{soft}$ is a maximum soft channel corresponding to Category 6 or Category 7, and the maximum number, of layers for spatial multiplexing in downlink, supported by the UE is two, it is determined that Kc=2. If the maximum number, of layers for spatial multiplexing in downlink, supported by the UE is four, it is determined that Kc=1. When $N_{soft}$ is a maximum soft channel corresponding to Category 6 or Category 7, and the maximum number, of layers for spatial multiplexing in downlink, supported by the UE is four, it is determined that Kc=1. When $N_{soft}$ is a maximum soft channel corresponding to Category 8, it is determined that Kc=5.

Optionally, when $N_{soft}$ is a maximum soft channel corresponding to Category A, and the target modulation scheme is used as the highest order modulation scheme in downlink transmission performed with the UE, it may be determined that Kc=1. When $N_{soft}$ is a maximum soft channel corresponding to Category A, the target modulation scheme is not used as the highest order modulation scheme in downlink transmission performed with the UE, and the maximum number, of layers for spatial multiplexing in downlink, supported by the UE is two, it may be determined that Kc=2. When $N_{soft}$ is a maximum soft channel corresponding to Category A, and the maximum number, of layers for spatial multiplexing in downlink, supported by the UE is four, it is determined that Kc=1.

Optionally, when $N_{soft}$ is a maximum soft channel corresponding to Category B, the target modulation scheme is used as the highest order modulation scheme in downlink transmission performed with the UE, and the maximum number, of layers for spatial multiplexing in downlink, supported by the UE is four, it may be determined that Kc=1. When $N_{soft}$ is a maximum soft channel corresponding to Category B, the target modulation scheme is used as the highest order modulation scheme in downlink transmission performed with the UE, and the maximum number, of layers for spatial multiplexing in downlink, supported by the UE is two, it may be determined that Kc=2. When $N_{soft}$ is a maximum soft channel corresponding to Category B, the target modulation scheme is not used as the highest order modulation scheme in downlink transmission performed with the UE, and the maximum number, of layers for spatial multiplexing in downlink, supported by the UE is four, it may be determined that Kc=2. When $N_{soft}$ is a maximum soft channel corresponding to Category B, the target modulation scheme is not used as the highest order modulation scheme in downlink transmission performed with the UE, and the maximum number, of layers for spatial multiplexing in downlink, supported by the UE is two, it may be determined that Kc=3.

Optionally, when $N_{soft}$ is a maximum soft channel corresponding to Category C, and values of M1, M2, and M4 are all max(2*N1, N2), it may be determined that Kc=1; when $N_{soft}$ is a maximum soft channel corresponding to Category C, values of M1, M2, and M4 are max(4*N1, 2*N2), and the maximum number, of layers for spatial multiplexing in downlink, supported by the UE is four, it may be determined that Kc=1; when $N_{soft}$ is a maximum soft channel corresponding to Category C, values of M1, M2, and M4 are max(4*N1, 2*N2), and the maximum number, of layers for spatial multiplexing in downlink, supported by the UE is two, it may be determined that Kc=2.

Optionally, when $N_{soft}$ is a maximum soft channel corresponding to Category C, values of M1, M2, and M4 are max(6*N1, 3*N2, 75376*8, 149776*4), the target modulation scheme is used as the highest order modulation scheme in downlink transmission performed with the UE, and the maximum number, of layers for spatial multiplexing in downlink, supported by the UE is four, it may be determined that Kc=2 or 1 or 3/2 (the "/" denotes a division sign, that is, 3/2 is 1.5). When $N_{soft}$ is a maximum soft channel corresponding to Category C, values of M1, M2, and M4 are max(6*N1, 3*N2, 75376*8, 149776*4), the target modulation scheme is used as the highest order modulation scheme in downlink transmission performed with the UE, and the maximum number, of layers for spatial multiplexing in downlink, supported by the UE is two, it may be determined that Kc=3. When $N_{soft}$ is a maximum soft channel corresponding to Category C, values of M1, M2, and M4 are max(6*N1, 3*N2, 75376*8, 149776*4), the target modulation scheme is not used as the highest order modulation scheme in downlink transmission performed with the UE, and the maximum number, of layers for spatial multiplexing in downlink, supported by the UE is four, it may be determined that Kc=2. When $N_{soft}$ is a maximum soft channel corresponding to Category C, values of M1, M2, and M4 are max(6*N1, 3*N2, 75376*8, 149776*4), the target modulation scheme is not used as the highest order modulation scheme in downlink transmission performed with the UE, and the maximum number, of layers for spatial multiplexing in downlink, supported by the UE is two, it may be determined that Kc=4.

Optionally, when $N_{soft}$ is a maximum soft channel corresponding to Category C, values of M1, M2, and M4 are max(8*N1, 4*N2), the target modulation scheme is used as the highest order modulation scheme in downlink transmission performed with the UE, and the maximum number, of layers for spatial multiplexing in downlink, supported by the UE is four, it may be determined that Kc=2. When $N_{soft}$ is a maximum soft channel corresponding to Category C, values of M1, M2, and M4 are max(8*N1, 4*N2), the target modulation scheme is used as the highest order modulation scheme in downlink transmission performed with the UE, and the maximum number, of layers for spatial multiplexing in downlink, supported by the UE is two, it may be determined that Kc=4. When $N_{soft}$ is a maximum soft channel corresponding to Category C, values of M1, M2, and M4 are max(8*N1, 4*N2), the target modulation scheme is not used as the highest order modulation scheme in downlink transmission performed with the UE, and the maximum number, of layers for spatial multiplexing in downlink, supported by the UE is four, it may be determined that Kc=3 or 2 or 8/3. When $N_{soft}$ is a maximum soft channel corresponding to Category C, values of M1, M2, and M4 are max(8*N1, 4*N2), the target modulation scheme is not used as the highest order modulation scheme in downlink transmission performed with the UE, and the maximum number, of layers for spatial multiplexing in downlink, supported by the UE is two, it may be determined that Kc=5.

Optionally, when $N_{soft}$ is a maximum soft channel corresponding to Category C, values of M1, M2, and M4 are max(10*N1, 5*N2), the target modulation scheme is used as the highest order modulation scheme in downlink transmission performed with the UE, and the maximum number, of layers for spatial multiplexing in downlink, supported by the UE is four, it may be determined that Kc=2 or 3 or 5/2. When $N_{soft}$ is a maximum soft channel corresponding to Category C, values of M1, M2, and M4 are max(10*N1, 5*N2), the target modulation scheme is used as the highest order modulation scheme in downlink transmission performed with the UE, and the maximum number, of layers for spatial multiplexing in downlink, supported by the UE is two, it may be determined that Kc=5. When $N_{soft}$ is a maximum soft channel corresponding to Category C, values of M1, M2, and M4 are max(10*N1, 5*N2), the target modulation scheme is not used as the highest order modulation scheme in downlink transmission performed with the UE, and the maximum number, of layers for spatial multiplexing in downlink, supported by the UE is four, it may be determined that Kc=3 or 4 or 10/3. When $N_{soft}$ is a maximum soft channel corresponding to Category C, values of M1, M2, and M4 are max(10*N1, 5*N2), the target modulation scheme is not used as the highest order modulation scheme in downlink transmission performed with the UE, and the maximum number, of layers for spatial multiplexing in downlink, supported by the UE is two, it may be determined that Kc=5.

Optionally, when $N_{soft}$ is a maximum soft channel corresponding to Category C, and values of M3 and M4 are 603008, and the maximum number, of layers for spatial multiplexing in downlink, supported by the UE is four, regardless of whether the target modulation scheme is used as the highest order modulation scheme in downlink transmission performed with the UE, it may be determined that Kc=2 or 3/2. When $N_{soft}$ is a maximum soft channel corresponding to Category C, values of M3 and M4 are 603008, the target modulation scheme is used as the highest order modulation scheme in downlink transmission performed with the UE, and the maximum number, of layers for spatial multiplexing in downlink, supported by the UE is two, it may be determined that Kc=3. When $N_{soft}$ is a maximum soft channel corresponding to Category C, values of M3 and M4 are 603008, the target modulation scheme is not used as the highest order modulation scheme in downlink transmission performed with the UE, and the maximum number, of layers for spatial multiplexing in downlink, supported by the UE is two, it may be determined that Kc=4.

Optionally, when $N_{soft}$ is a maximum soft channel corresponding to Category C, values of M3 and M4 are 753760, and the maximum number, of layers for spatial multiplexing in downlink, supported by the UE is four, regardless of whether the target modulation scheme is used as the highest order modulation scheme in downlink transmission performed with the UE, it may be determined that Kc=2 or 3 or 5/2. When $N_{soft}$ is a maximum soft channel corresponding to Category C, values of M3 and M4 are 753760, the target modulation scheme is used as the highest order modulation scheme in downlink transmission performed with the UE, and the maximum number, of layers for spatial multiplexing in downlink, supported by the UE is two, it may be determined that Kc=3 or 4 or 15/4. When $N_{soft}$ is a maximum soft channel corresponding to Category C, values of M3 and M4 are 753760, the target modulation scheme is not used as the highest order modulation scheme in downlink transmission performed with the UE, and the maximum number, of layers for spatial multiplexing in downlink, supported by the UE is two, it may be determined that Kc=5.

Optionally, when $N_{soft}$ is a maximum soft channel corresponding to Category C, values of M3 and M4 are 898656, and the maximum number, of layers for spatial multiplexing in downlink, supported by the UE is four, regardless of whether the target modulation scheme is used as the highest order modulation scheme in downlink transmission performed with the UE, it may be determined that Kc=3 or 2 or 9/4. When $N_{soft}$ is a maximum soft channel corresponding to Category C, values of M3 and M4 are 898656, the target modulation scheme is used as the highest order modulation scheme in downlink transmission performed with the UE, and the maximum number, of layers for spatial multiplexing in downlink, supported by the UE is two, it may be determined that Kc=4 or 5 or 9/2. When $N_{soft}$ is a maximum soft channel corresponding to Category C, values of M3 and M4 are 898656, the target modulation scheme is not used as the highest order modulation scheme in downlink transmission performed with the UE, and the maximum number, of layers for spatial multiplexing in downlink, supported by the UE is two, it may be determined that Kc=5.

Optionally, when $N_{soft}$ is a maximum soft channel corresponding to Category C, values of M3 and M4 are both 1198208, and the maximum number, of layers for spatial multiplexing in downlink, supported by the UE is four, regardless of whether the target modulation scheme is used as the highest order modulation scheme in downlink transmission performed with the UE, it may be determined that Kc=4 or 3. When $N_{soft}$ is a maximum soft channel corresponding to Category C, values of M3 and M4 are both 1198208, and the maximum number, of layers for spatial multiplexing in downlink, supported by the UE is two, regardless of whether the target modulation scheme is used as the highest order modulation scheme in downlink transmission performed with the UE, it may be determined that Kc=5.

Optionally, when $N_{soft}$ is a maximum soft channel corresponding to Category C, and values of M3 and M4 are 1497760, it may be directly determined that Kc=5.

Optionally, when $N_{soft}$ is a maximum soft channel corresponding to Category D, it may be directly determined that Kc=5.

Optionally, only examples of Kc being 1 to 5 are listed above. In addition, Kc may be also another natural number from 0 to 5, or a non-integer.

Optionally, $M_{limit}$ may be a predefined positive real number, for example, $M_{limit}$=8. Alternatively, when the target modulation scheme is used as the highest order modulation scheme in downlink transmission performed with the UE, $M_{limit}$ is a positive real number less than 8; when the target modulation scheme is not used as the highest order modulation scheme in downlink transmission performed with the UE, $M_{limit}$=8.

Optionally, the calculation unit 24 may further calculate a soft buffer size of the DL-SCH transport block by using the following formula:

$$N_{IR} = \left\lfloor \frac{N_{soft}}{\alpha \cdot K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, α is a predefined positive real number, $K_C$ is a positive real number, $K_{MIMO}$ is a natural number in a value range from 1 to 2, $M_{DL\_HARQ}$ is a maximum downlink HARQ process number, $M_{limit}$ is a predefined positive real number, and $\min(M_{DL\_HARQ}, M_{limit})$ denotes taking a smaller value of $M_{DL\_HARQ}$ and $M_{limit}$. For the parameters in the foregoing formula, the parameters described above may be used, and are not described herein again.

Optionally, the base station may further include: a sending unit 25, configured to send first configuration information and second configuration information to the UE, where the first configuration information is used to indicate the downlink transmission mode, and the second configuration information is used to indicate whether the target modulation scheme is supported when downlink transmission is performed with the UE, so that the UE calculates the soft buffer size of the DL-SCH transport block according to the UE category of the UE, the downlink transmission mode, the maximum number of bits of data transmitted on a soft channel, and whether the target modulation scheme is supported when downlink transmission is performed with the UE.

In the implementation manner, it may be implemented that the UE calculates the soft buffer size of the DL-SCH transport block. In addition, whether the target modulation scheme is supported during downlink transmission with the UE may also be understood as whether to use the target modulation scheme as a modulation scheme of downlink data during downlink transmission with the UE.

Optionally, the base station may further include: a third receiving unit 26, configured to receive a maximum number, of RBs that can be received by the UE when the target modulation scheme is used in downlink transmission, reported by the UE, and determine, according to the highest order modulation scheme supported by the UE and the received maximum number of RBs, a number of RBs allocated to the UE, so that the number of RBs allocated to the UE is less than or equal to the received maximum number of RB.

In the implementation manner, the highest order modulation scheme supported by the UE may be the target modulation scheme, and the target modulation scheme is 256QAM. In addition, the number of RBs allocated to the UE may be also a maximum number, of RBs that can be received by the UE, in the downlink parameter, where the maximum number, of RBs that can be received by the UE, in the downlink parameter is the maximum number, of RBs that can be received by the UE when the target modulation scheme is used in downlink transmission, reported by the UE.

For example, if a maximum number, of RBs that can be received by the UE when a 256QAM modulation scheme is used in downlink transmission, reported by the UE is X, where X is an integer from 1 to 110, and the supported highest order modulation scheme reported by the UE is 256QAM, the base station determines that the number Y of RBs allocated to the UE is less than or equal to X. In the method, it can be prevented that the number of RBs allocated to the UE is excessively high to exceed a processing capability of the UE and to cause a demodulation error of the UE.

Optionally, the base station may further include: an establishment unit 27, configured to establish a correspondence from a UE category and a highest order modulation scheme to a downlink parameter, and send the correspondence to the UE; or a fourth receiving unit 28, configured to receive a correspondence, sent by the UE, from a UE category and a highest order modulation scheme to a downlink parameter.

The correspondence established or received in the implementation manner is the correspondence used by a determining unit 23, and the correspondence may specifically include correspondences listed in Table 1 to Table 6.2.

In the foregoing technical solution, multiple optional implementation manners are introduced on the basis of the above mentioned embodiments, and in all the implementation manners, it can be implemented that after UE supports a higher modulation scheme, a feature of a higher modulation scheme can be introduced for the UE, so as to improve spectral efficiency.

Figure 4:
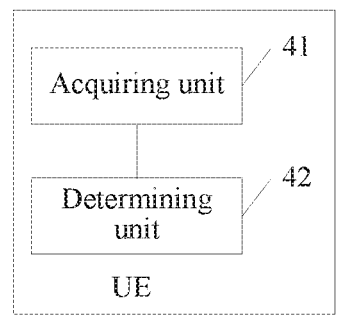
FIG. 4 is a schematic structural diagram of UE according to an embodiment.

Referring to FIG. 4, FIG. 4 is a schematic structural diagram of UE according to an embodiment. As shown in FIG. 4, the UE includes: an acquiring unit 41 and a determining unit 42.

The acquiring unit 41 is configured to acquire category information and modulation information of the UE, where the category information includes a UE category of the UE, and the modulation information includes a highest order modulation scheme supported by the UE.

Optionally, the acquiring unit 41 may locally acquire the category information and the modulation information of the UE, or the acquiring unit 41 acquires the category information and the modulation information of the UE in a manner of calculation or identification.

The determining unit 42 is configured to determine, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

Figure 5:
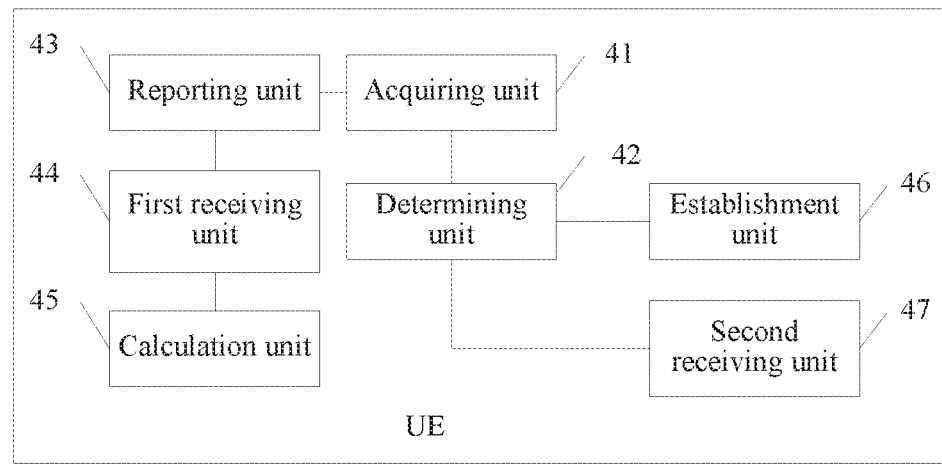
FIG. 5 is a schematic structural diagram of another UE according to an embodiment.

In addition, as shown in FIG. 5, the UE may further include: a reporting unit 43, configured to report the category information and the modulation information to a base station, so that the base station determines, as a downlink parameter of the UE, a downlink parameter that corresponds to the UE category of the UE and the highest order modulation scheme supported by the UE, where the downlink parameter of the UE is determined according to the correspondence from a UE category of the UE and a highest order modulation scheme supported by the UE to a downlink parameter of the UE as well as the UE category of the UE and the highest order modulation scheme supported by the UE.

Optionally, the modulation information may include at least one of the following information used to represent whether the highest order modulation scheme supported by the UE is a target modulation scheme and a highest order modulation order of a downlink modulation scheme, where the target modulation scheme includes 256 quadrature amplitude modulation QAM or a modulation scheme whose order is higher than 64QAM.

Optionally, the determining unit 42 may be further configured to determine, as a downlink parameter of the UE, a downlink parameter that is of the UE and that corresponds to the UE category of the UE, the highest order modulation scheme supported by the UE, and the maximum number, of layers for spatial multiplexing in downlink, supported by the UE, where the downlink parameter of the UE is determined according to a correspondence from a UE category of the UE, a highest order modulation scheme supported by the UE, and a maximum number, of layers for spatial multiplexing in downlink, supported by the UE to a downlink parameter of the UE as well as the UE category of the UE, the highest order modulation scheme supported by the UE, and the maximum number, of layers for spatial multiplexing in downlink, supported by the UE.

In the implementation manner, the acquiring unit 41 may further acquire the maximum number, of layers for spatial multiplexing in downlink, supported by the UE.

Optionally, the downlink parameter may include at least one of the following: a maximum number of bits that can be received by the UE within one transmission time interval TTI, where the number of bits is a number of bits of data transmitted in a downlink shared channel DL-SCH transport block, a maximum number of bits, which can be received by the UE within one TTI, of data transmitted in one DL-SCH transport block, a maximum number of bits of data transmitted on a soft channel, and a maximum number of RBs that can be received by the UE.

The UE may further include: a first receiving unit 44, configured to receive first configuration information and second configuration information that are sent by the base station, where the first configuration information is used to indicate a downlink transmission mode, and the second configuration information is used to indicate whether the target modulation scheme is supported when downlink transmission is performed with the UE; and a calculation unit 45, configured to calculate a soft buffer size of the DL-SCH transport block according to the UE category of the UE, the downlink transmission mode, the maximum number of bits of data transmitted on a soft channel, and whether the target modulation scheme is supported when downlink transmission is performed with the UE, where the downlink transmission mode includes a transmission mode in which the base station and the UE perform downlink transmission, and the target modulation scheme includes 256 quadrature amplitude modulation QAM or a modulation scheme whose order is higher than 64QAM.

Optionally, the calculation unit 45 may calculate the soft buffer size of the DL-SCH transport block by using the following formula:

$$N_{IR} = \left\lfloor \frac{N_{soft}}{K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $K_C$ is a positive real number determined according to whether the target modulation scheme is supported in downlink transmission performed by the base station and the UE, $K_{MIMO}$ is a natural number in a value range from 1 to 2, $M_{DL\_HARQ}$ is a maximum downlink hybrid automatic repeat request HARQ process number, $M_{limit}$ is a predefined positive real number, and $\min(M_{DL\_HARQ}, M_{limit})$ denotes taking a smaller value of $M_{DL\_HARQ}$ and $M_{limit}$; or the calculation unit 45 may calculate the soft buffer size of the DL-SCH transport block by using the following formula:

$$N_{IR} = \left\lfloor \frac{N_{soft}}{\alpha \cdot K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $\alpha$ is a predefined positive real number, $K_C$ is a positive real number determined according to whether the target modulation scheme is supported in downlink transmission performed by the base station and the UE, $K_{MIMO}$ is a natural number in a value range from 1 to 2, $M_{DL\_HARQ}$ is a maximum downlink HARQ process number, $M_{limit}$ is a predefined positive real number, and $\min(M_{DL\_HARQ}, M_{limit})$ denotes taking a smaller value of $M_{DL\_HARQ}$ and $M_{limit}$.

Optionally, $K_C$ may be also a received natural number from 1 to 5 that is configured by the base station by using higher layer signaling, or a non-integer from 1 to 5. Certainly, for $K_C$, a manner for calculating $K_C$ in the embodiment shown in FIG. 2 may be further used to calculate $K_C$, and is not described herein again.

Optionally, the UE may further include: an establishment unit 46, configured to establish a correspondence from a UE category and a highest order modulation scheme to a downlink parameter, and send the correspondence to the base station; or a second receiving unit 47, configured to receive a correspondence, sent by the base station, from a UE category and a highest order modulation scheme to a downlink parameter.

The correspondence established or received in the implementation manner is the correspondence used by a determining unit 42, and the correspondence may specifically include the correspondences listed in Table 1 to Table 6.2.

In the foregoing technical solution, category information and modulation information of UE are acquired, where the category information includes a UE category of the UE, and the modulation information includes a highest order modulation scheme supported by the UE; and according to a correspondence from a UE category of the UE and a highest order modulation scheme supported by the UE to a downlink parameter of the UE as well as the UE category of the UE and the highest order modulation scheme supported by the UE, a downlink parameter that corresponds to the UE category of the UE and the highest order modulation scheme supported by the UE is determined as a downlink parameter of the UE. In this way, it can be implemented that after UE supports a higher modulation scheme, a downlink parameter of the UE can be determined according to the higher modulation scheme, so that it can be implemented that a modulation feature of the UE is fully used during a process of downlink transmission. In addition, because a feature of a highest order modulation scheme supported by the UE can be introduced in downlink transmission, spectral efficiency in downlink transmission can be improved.

Figure 6:
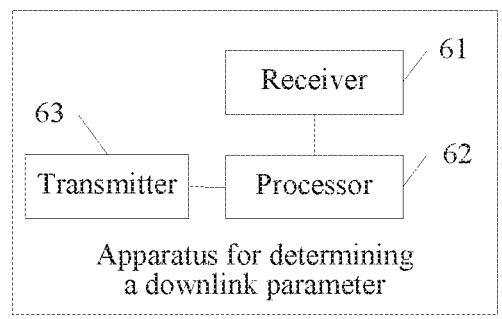
FIG. 6 is a schematic structural diagram of an apparatus for determining a downlink parameter according to an embodiment.

Referring to FIG. 6, FIG. 6 is a schematic structural diagram of an apparatus for determining a downlink parameter according to an embodiment. As shown in FIG. 6, the apparatus includes: a receiver 61 and a processor 62.

The receiver 61 is configured to receive category information and modulation information that are reported by UE, where the category information includes a UE category of the UE, and the modulation information includes a highest order modulation scheme supported by the UE.

The processor 62 is configured to determine, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

Optionally, the modulation information includes at least one of the following: information used to represent whether the highest order modulation scheme supported by the UE is a target modulation scheme and a highest order modulation order of a downlink modulation scheme, where the target modulation scheme includes 256 quadrature amplitude modulation QAM or a modulation scheme whose order is higher than 64QAM.

Optionally, the receiver 61 may be further configured to receive layer number information that is reported by the UE and that is used to represent a maximum number, of layers for spatial multiplexing in downlink, supported by the UE.

The processor 62 may be further configured to determine, as a downlink parameter of the UE, a downlink parameter that is of the UE and that corresponds to the UE category of the UE, the highest order modulation scheme supported by the UE, and the maximum number, of layers for spatial multiplexing in downlink, supported by the UE, where the downlink parameter of the UE is determined according to a correspondence from a UE category of the UE, a highest order modulation scheme supported by the UE, and a maximum number, of layers for spatial multiplexing in downlink, supported by the UE to a downlink parameter of the UE as well as the UE category of the UE, the highest order modulation scheme supported by the UE, and the maximum number, of layers for spatial multiplexing in downlink, supported by the UE.

Optionally, the downlink parameter may include at least one of the following: a maximum number of bits that can be received by the UE within one transmission time interval TTI, where the number of bits is a number of bits of data transmitted in a downlink shared channel DL-SCH transport block, a maximum number of bits, which can be received by the UE within one TTI, of data transmitted in one DL-SCH transport block, a maximum number of bits of data transmitted on a soft channel, and a maximum number of resource blocks RBs that can be received by the UE.

Optionally, the processor 62 may be further configured to calculate a soft buffer size of the DL-SCH transport block according to the UE category of the UE, a downlink transmission mode, and the maximum number of bits of data transmitted on a soft channel, where the downlink transmission mode includes a transmission mode in which downlink transmission with the UE is performed.

Optionally, the processor 62 may be further configured to calculate the soft buffer size of the DL-SCH transport block by using the following formula:

$$N_{IR} = \left\lfloor \frac{N_{soft}}{K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $K_C$ is a positive real number, $K_{MIMO}$ is a natural number in a value range from 1 to 2, $M_{DL\_HARQ}$ is a maximum downlink hybrid automatic repeat request (HARQ) process number, $M_{limit}$ is a predefined positive real number, and $\min(M_{DL\_HARQ}, M_{limit})$ denotes taking a smaller value of $M_{DL\_HARQ}$ and $M_{limit}$; or the processor 62 may be further configured to calculate the soft buffer size of the DL-SCH transport block by using the following formula:

$$N_{IR} = \left\lfloor \frac{N_{soft}}{\alpha \cdot K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $\alpha$ is a predefined positive real number, $K_C$ is a positive real number, $K_{MIMO}$ is a natural number in a value range from 1 to 2, $M_{DL\_HARQ}$ is a maximum downlink HARQ process number, $M_{limit}$ is a predefined positive real number, and $\min(M_{DL\_HARQ}, M_{limit})$ denotes taking a smaller value of $M_{DL\_HARQ}$ and $M_{limit}$.

Optionally, the apparatus may further include a transmitter 63.

The transmitter 63 is configured to send first configuration information and second configuration information to the UE, where the first configuration information is used to indicate the downlink transmission mode, and the second configuration information is used to indicate whether the target modulation scheme is supported when downlink transmission is performed with the UE, so that the soft buffer size of the DL-SCH transport block is calculated according to the UE category of the UE, the downlink transmission mode, the maximum number of bits of data transmitted on a soft channel, and whether the target modulation scheme is supported when downlink transmission is performed with the UE.

Optionally, the receiver 61 may be further configured to receive a maximum number, of RBs that can be received by the UE when the target modulation scheme is used in downlink transmission, reported by the UE; and the processor 62 may be further configured to determine, according to the highest order modulation scheme supported by the UE and the received maximum number of RBs, a number of RBs allocated to the UE, so that the number of RBs allocated to the UE is less than or equal to the received maximum number of RB.

Optionally, the processor 62 may be further configured to establish a correspondence from a UE category and a highest order modulation scheme to a downlink parameter; and the transmitter 63 may be further configured to send the correspondence to the UE; or the receiver 61 may be further configured to receive a correspondence, sent by the UE, from a UE category and a highest order modulation scheme to a downlink parameter.

In the foregoing technical solution, category information and modulation information that are reported by UE are received, where the category information includes a UE category of the UE, and the modulation information includes a highest order modulation scheme supported by the UE; and according to a correspondence from a UE category of the UE and a highest order modulation scheme supported by the UE to a downlink parameter of the UE as well as the UE category of the UE and the highest order modulation scheme supported by the UE, a downlink parameter that corresponds to the UE category of the UE and the highest order modulation scheme supported by the UE is then determined as a downlink parameter of the UE. In this way, it can be implemented that after UE supports a higher modulation scheme, a downlink parameter of the UE can be determined according to the higher modulation scheme, and the higher modulation scheme can be introduced during downlink transmission, so that it can be implemented that a modulation feature of the UE is fully used during a process of downlink transmission. In addition, because a feature of a highest order modulation scheme supported by the UE can be introduced in downlink transmission, spectral efficiency in downlink transmission can be improved.

Figure 7:
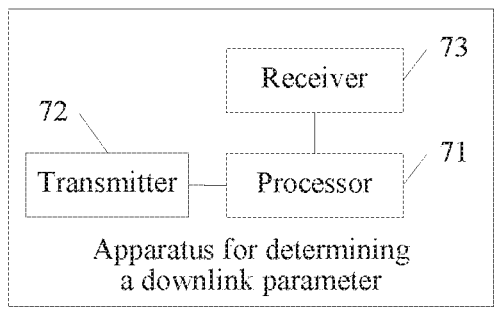
FIG. 7 is a schematic structural diagram of another apparatus for determining a downlink parameter according to an embodiment.

Referring to FIG. 7, FIG. 7 is a schematic structural diagram of an apparatus for determining a downlink parameter according to an embodiment. As shown in FIG. 7, the apparatus includes: a processor 71.

The processor 71 is configured to acquire category information and modulation information of UE, where the category information includes a UE category of the UE, and the modulation information includes a highest order modulation scheme supported by the UE.

The processor 71 is further configured to determine, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

Optionally, the apparatus may further include a transmitter 72.

The transmitter 72 is configured to report the category information and the modulation information to a base station, so that the base station determines, as a downlink parameter of the UE, a downlink parameter that corresponds to the UE category of the UE and the highest order modulation scheme supported by the UE, where the downlink parameter of the UE is determined according to the correspondence from a UE category of the UE and a highest order modulation scheme supported by the UE to a downlink parameter of the UE as well as the UE category of the UE and the highest order modulation scheme supported by the UE.

Optionally, the modulation information includes at least one of the following: information used to represent whether the highest order modulation scheme supported by the UE is a target modulation scheme and a highest order modulation order of a downlink modulation scheme, where the target modulation scheme includes 256 quadrature amplitude modulation QAM or a modulation scheme whose order is higher than 64QAM.

Optionally, the processor 71 may be further configured to determine, as a downlink parameter of the UE, a downlink parameter that is of the UE and that corresponds to the UE category of the UE, the highest order modulation scheme supported by the UE, and the maximum number, of layers for spatial multiplexing in downlink, supported by the UE, where the downlink parameter of the UE is determined according to a correspondence from a UE category of the UE, a highest order modulation scheme supported by the UE, and a maximum number, of layers for spatial multiplexing in downlink, supported by the UE to a downlink parameter of the UE as well as the UE category of the UE, the highest order modulation scheme supported by the UE, and the maximum number, of layers for spatial multiplexing in downlink, supported by the UE.

Optionally, the downlink parameter may include at least one of the following: a maximum number of bits that can be received by the UE within one transmission time interval TTI, where the number of bits is a number of bits of data transmitted in a downlink shared channel DL-SCH transport block, a maximum number of bits, which can be received by the UE within one TTI, of data transmitted in one DL-SCH transport block, a maximum number of bits of data transmitted on a soft channel, and a maximum number of resource blocks RBs that can be received by the UE.

Optionally, the apparatus may further include a receiver 73, where the receiver 73 is configured to receive first configuration information and second configuration information that are sent by the base station, where the first configuration information is used to indicate a downlink transmission mode, and the second configuration information is used to indicate whether the target modulation scheme is supported when downlink transmission is performed with the UE; and the processor 71 may be further configured to calculate a soft buffer size of the DL-SCH transport block according to the UE category of the UE, the downlink transmission mode, the maximum number of bits of data transmitted on a soft channel, and whether the target modulation scheme is supported when downlink transmission is performed with the UE, where the downlink transmission mode includes a transmission mode in which the base station and the UE perform downlink transmission, and the target modulation scheme includes 256 QAM or a modulation scheme whose order is higher than 64QAM.

Optionally, the processor 71 may be further configured to calculate the soft buffer size of the DL-SCH transport block by using the following formula:

$$N_{IR} = \left\lfloor \frac{N_{soft}}{K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $K_C$ is a positive real number determined according to whether the target modulation scheme is supported in downlink transmission performed by the base station and the UE, $K_{MIMO}$ is a natural number in a value range from 1 to 2, $M_{DL\_HARQ}$ is a maximum downlink hybrid automatic repeat request HARQ process number, $M_{limit}$ is a predefined positive real number, and $\min(M_{DL\_HARQ}, M_{limit})$ denotes taking a smaller value of $M_{DL\_HARQ}$ and $M_{limit}$; or the processor 71 may be further configured to calculate the soft buffer size of the DL-SCH transport block by using the following formula:

$$N_{IR} = \left\lfloor \frac{N_{soft}}{\alpha \cdot K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $\alpha$ is a predefined positive real number, $K_C$ is a positive real number determined according to whether the target modulation scheme is supported in downlink transmission performed by the base station and the UE, $K_{MIMO}$ is a natural number in a value range from 1 to 2, $M_{DL\_HARQ}$ is a maximum downlink HARQ process number, $M_{limit}$ is a predefined positive real number, and $\min(M_{DL\_HARQ}, M_{limit})$ denotes taking a smaller value of $M_{DL\_HARQ}$ and $M_{limit}$.

Optionally, the processor 71 may be further configured to establish a correspondence from a UE category and a highest order modulation scheme to a downlink parameter; and the transmitter 72 may be further configured to send the correspondence to the base station; or the receiver 73 may be further configured to receive a correspondence, sent by the base station, from a UE category and a highest order modulation scheme to a downlink parameter.

In the foregoing technical solution, category information and modulation information of UE are acquired, where the category information includes a UE category of the UE, and the modulation information includes a highest order modulation scheme supported by the UE; and according to a correspondence from a UE category of the UE and a highest order modulation scheme supported by the UE to a downlink parameter of the UE as well as the UE category of the UE and the highest order modulation scheme supported by the UE, a downlink parameter that corresponds to the UE category of the UE and the highest order modulation scheme supported by the UE is determined as a downlink parameter of the UE as a downlink parameter of the UE. In this way, it can be implemented that after UE supports a higher modulation scheme, a downlink parameter of the UE can be determined according to the higher modulation scheme, so that it can be implemented that a modulation feature of the UE is fully used during a process of downlink transmission. In addition, because a feature of a highest order modulation scheme supported by the UE can be introduced in downlink transmission, spectral efficiency in downlink transmission can be improved.

Figure 8:
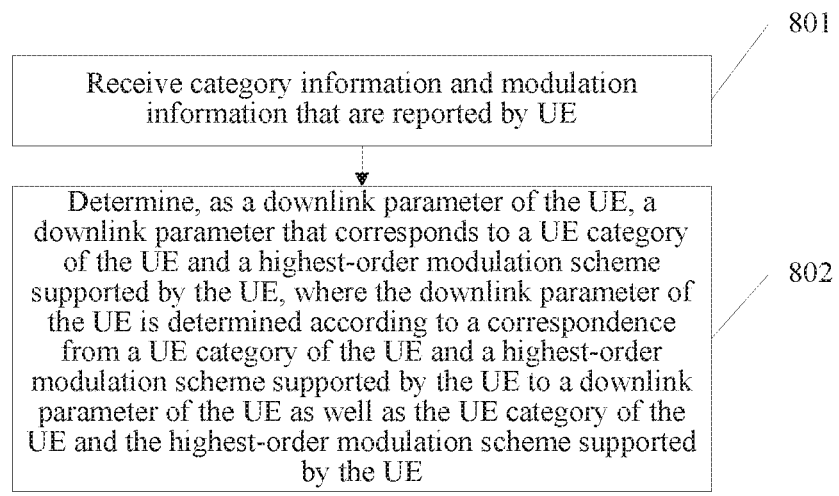
FIG. 8 is a schematic flowchart of a method for determining a downlink parameter according to an embodiment.

Referring to FIG. 8, FIG. 8 is a schematic flowchart of a method for determining a downlink parameter according to an embodiment. As shown in FIG. 8, the method includes.

801: Receive category information and modulation information that are reported by UE, where the category information includes a UE category of the UE, and the modulation information includes a highest order modulation scheme supported by the UE.

Optionally, the UE category of the UE is not limited in this embodiment. For example, the UE category of the UE may be any one of 8 UE categories that are defined in an LTE release 10 system (LTE Rel-10 for short). In addition, apart from the 8 UE categories, the UE category of the UE may be also a UE category defined in another system (for example, an LTE release 11 system, and an LTE release 12 system) than the LTE release 10 system (LTE Rel-10 for short).

Optionally, the highest order modulation scheme supported by the UE is not limited. For example, the highest order modulation scheme supported by the UE may be 64QAM, 256QAM, a modulation scheme whose order is higher than 64QAM, or the like.

802: Determine, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

Optionally, the correspondence may include correspondences of multiple UE categories, where a correspondence of each UE category is a correspondence from the UE category and at least one highest order modulation scheme to at least one downlink parameter. For example, a highest order modulation scheme supported in a UE category 1 may include 64QAM and 256QAM; in this case, the correspondence may include a correspondence from the UE category 1 and a supported highest order modulation scheme of 64QAM to a downlink parameter 1, and further include a correspondence from the UE category 1 and a supported highest order modulation scheme of 256QAM to a downlink parameter 2. In this way, when the UE category of the UE is the UE category 1, and the highest order modulation scheme supported by the UE is 256QAM, in step 802, it may be determined that the downlink parameter 2 is the downlink parameter of the UE.

Optionally, the UE category included in the category information may be one or more UE categories; in this case, in step 802, one or more downlink parameters may be determined for the UE, where each downlink parameter corresponds to one UE category.

Optionally, the method may be applied to a base station, that is, the base station may implement the method.

In the foregoing technical solution, category information and modulation information that are reported by UE are received, where the category information includes a UE category of the UE, and the modulation information includes a highest order modulation scheme supported by the UE; and according to a correspondence from a UE category of the UE and a highest order modulation scheme supported by the UE to a downlink parameter of the UE as well as the UE category of the UE and the highest order modulation scheme supported by the UE, a downlink parameter that corresponds to the UE category of the UE and the highest order modulation scheme supported by the UE is then determined as a downlink parameter of the UE. In this way, it can be implemented that after UE supports a higher modulation scheme, a downlink parameter of the UE can be determined according to the higher modulation scheme, and the higher modulation scheme can be introduced during downlink transmission, so that it can be implemented that a modulation feature of the UE is fully used during a process of downlink transmission. In addition, because a feature of a highest order modulation scheme supported by the UE can be introduced in downlink transmission, spectral efficiency in downlink transmission can be improved.

Figure 9:
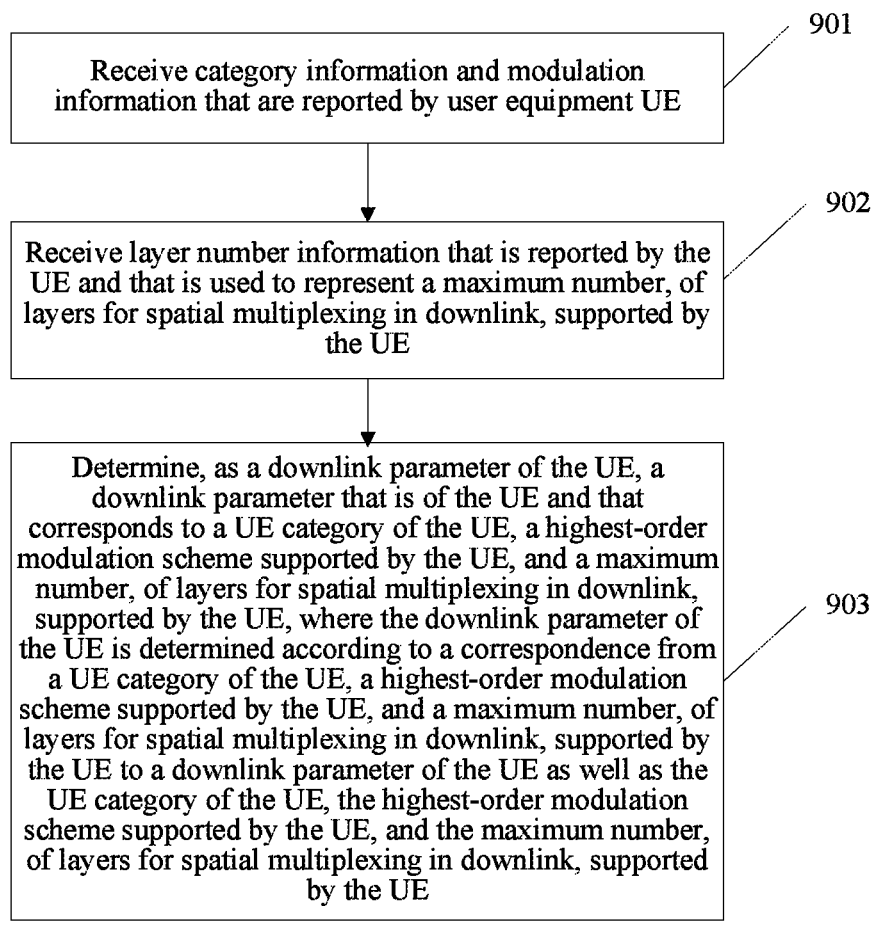
FIG. 9 is a schematic flowchart of another method for determining a downlink parameter according to an embodiment.

Referring to FIG. 9, FIG. 9 is a schematic flowchart of another method for determining a downlink parameter according to an embodiment. As shown in FIG. 9, the method includes.

901: Receive category information and modulation information that are reported by user equipment UE, where the category information includes a UE category of the UE, and the modulation information includes a highest order modulation scheme supported by the UE.

Optionally, the modulation information may include at least one of the following: information used to represent whether the highest order modulation scheme supported by the UE is a target modulation scheme and a highest order modulation order of a downlink modulation scheme, where the target modulation scheme includes 256 QAM or a modulation scheme whose order is higher than 64QAM.

Optionally, in this embodiment, when the information represents that the highest order modulation scheme supported by the UE is not the target modulation scheme, in the method, it may be further determined that the highest order modulation scheme supported by the UE is a candidate modulation scheme, where the candidate modulation scheme is a modulation scheme whose modulation order is lower than that of the target modulation scheme. For example, the target modulation scheme is 256QAM, and the candidate modulation scheme may then be 64QAM.

Optionally, because a highest order modulation order of a downlink modulation scheme is in a one-to-one correspondence with a supported highest order modulation scheme, in the method, the highest order modulation scheme supported by the UE may be directly obtained when the modulation information is the highest order modulation order of the downlink modulation scheme. For example, when the highest order modulation order of the downlink modulation scheme is 8, the highest order modulation scheme supported by the UE is then 256QAM; when the highest order modulation order of the downlink modulation scheme is 6, the highest order modulation scheme supported by the UE is then 64QAM.

902: Receive layer number information that is reported by the UE and that is used to represent a maximum number, of layers for spatial multiplexing in downlink, supported by the UE.

Optionally, the layer number information may be proactively reported by the UE, or after the UE receives a request message, the layer number information may be reported according to the request message.

Optionally, a time sequence of performing step 901 and step 902 is not limited.

903: Determine, as a downlink parameter of the UE, a downlink parameter that is of the UE and that corresponds to the UE category of the UE, the highest order modulation scheme supported by the UE, and the maximum number, of layers for spatial multiplexing in downlink, supported by the UE, where the downlink parameter of the UE is determined according to a correspondence from a UE category of the UE, a highest order modulation scheme supported by the UE, and a maximum number, of layers for spatial multiplexing in downlink, supported by the UE to a downlink parameter of the UE as well as the UE category of the UE, the highest order modulation scheme supported by the UE, and the maximum number, of layers for spatial multiplexing in downlink, supported by the UE.

Optionally, the correspondence may be represented in a form of a table; in this way, when the UE category of the UE, the highest order modulation scheme supported by the UE, and the maximum number, of layers for spatial multiplexing in downlink, supported by the UE are determined, the downlink parameter may be directly found from the table.

Optionally, the correspondence may include correspondences listed in Table 1 to Table 6.2.

Figure 10:
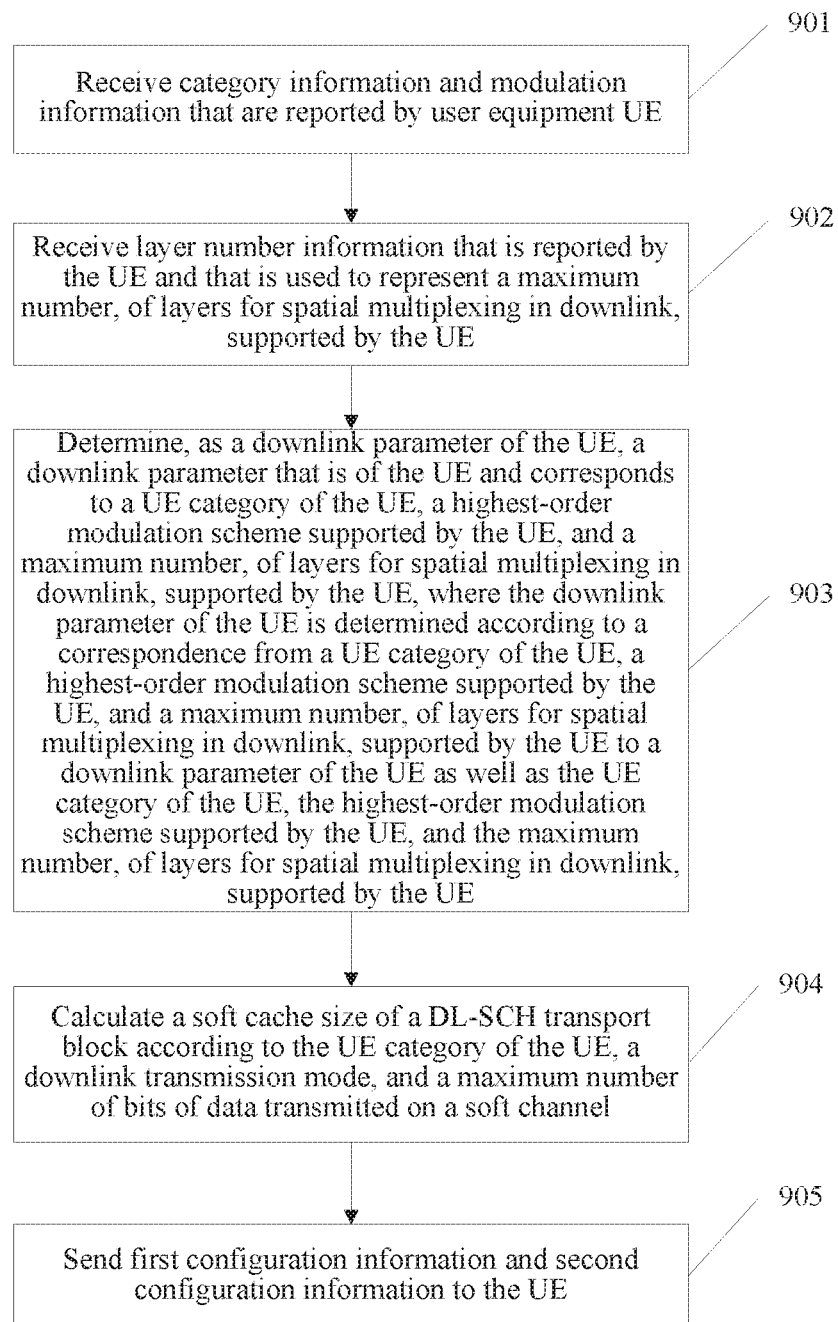
FIG. 10 is a schematic flowchart of another method for determining a downlink parameter according to an embodiment.

Optionally, the downlink parameter may include at least one of the following: a maximum number of bits that can be received by the UE within one transmission time interval TTI, where the number of bits is a number of bits of data transmitted in a downlink shared channel DL-SCH transport block, a maximum number of bits, which can be received by the UE within one TTI, of data transmitted in one DL-SCH transport block, a maximum number of bits of data transmitted on a soft channel, and a maximum number of resource blocks RBs that can be received by the UE. As shown in FIG. 10, the method may further include:

904: Calculate a soft buffer size of a DL-SCH transport block according to the UE category of the UE, a downlink transmission mode, and a maximum number of bits of data transmitted on a soft channel, where the downlink transmission mode includes a transmission mode in which downlink transmission with the UE is performed.

In the implementation manner, after the soft buffer size of the DL-SCH transport block is calculated, corresponding downlink transmission may be performed according to the soft buffer size of the DL-SCH transport block, so as to avoid a data loss caused when downlink data transmitted in the DL-SCH transport block exceeds the soft buffer size. In addition, in the method, a soft buffer size of a code block may be further determined, so as to perform bit collection on the code block according to the soft buffer size of the code block.

Optionally, step 904 may include: calculating the soft buffer size of the DL-SCH transport block by using the following formula:

$$N_{IR} = \left\lfloor \frac{N_{soft}}{K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $K_C$ is a positive real number, $K_{MIMO}$ is a natural number in a value range from 1 to 2, $M_{DL\_HARQ}$ is a maximum downlink hybrid automatic repeat request (HARQ) process number, $M_{limit}$ is a predefined positive real number, and $\min(M_{DL\_HARQ}, M_{limit})$ denotes taking a smaller value of $M_{DL\_HARQ}$ and $M_{limit}$.

Optionally, when the category information represents one or more UE categories, the downlink parameter determined in step 903 may include one or more downlink parameters, and each downlink parameter includes a maximum number of bits of data transmitted on one soft channel; in this way, in step 903, a maximum number of bits of data transmitted on one or more soft channels may be determined. When the category information represents one UE category, in step 903, a maximum number of bits of data transmitted only on one soft channel is determined, and $N_{soft}$ is the maximum number of bits of data transmitted on a soft channel. When the category information represents multiple UE categories, before step 903, the method further includes: determining one UE category from the multiple UE categories according to the UE categories of the UE and the downlink transmission mode and/or whether the target modulation scheme is supported in downlink transmission, so as to further determine, according to step 903 and according to the determined UE category, a maximum number of bits of data transmitted on one soft channel, where $N_{soft}$ is the maximum number of bits of data transmitted on a soft channel.

Optionally, step 904 may further include: calculating the soft buffer size of the DL-SCH transport block by using the following formula:

$$N_{IR} = \left\lfloor \frac{N_{soft}}{\alpha \cdot K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $\alpha$ is a predefined positive real number, $K_C$ is a positive real number, $K_{MIMO}$ is a natural number in a value range from 1 to 2, $M_{DL\_HARQ}$ is a maximum downlink HARQ process number, $M_{limit}$ is a predefined positive real number, and $\min(M_{DL\_HARQ}, M_{limit})$ denotes taking a smaller value of $M_{DL\_HARQ}$ and $M_{limit}$. For the parameters in the foregoing formula, the parameters described above may be used, and are not described herein again.

Optionally, after step 903, the method may further include.

905: Send first configuration information and second configuration information to the UE, where the first configuration information is used to indicate the downlink transmission mode, and the second configuration information is used to indicate whether the target modulation scheme is supported when downlink transmission is performed with the UE, so that the soft buffer size of the DL-SCH transport block is calculated according to the UE category of the UE, the downlink transmission mode, the maximum number of bits of data transmitted on a soft channel, and whether the target modulation scheme is supported when downlink transmission is performed with the UE.

In the implementation manner, it may be implemented that the UE calculates the soft buffer size of the DL-SCH transport block.

Optionally, the method may further include: establishing a correspondence from a UE category and a highest order modulation scheme to a downlink parameter, and sending the correspondence to the UE; or receiving a correspondence, sent by the UE, from a UE category and a highest order modulation scheme to a downlink parameter.

The correspondence established or received in the implementation manner is the correspondence used in step 903, and the correspondence may specifically include correspondences listed in Table 1 to Table 6.2.

The method may further include: receiving a maximum number, of RBs that can be received by the UE when the target modulation scheme is used in downlink transmission, reported by the UE, and determining, according to the highest order modulation scheme supported by the UE and the received maximum number of RBs, a number of RBs allocated to the UE, so that the number of RBs allocated to the UE is less than or equal to the received maximum number of RB.

In the implementation manner, the highest order modulation scheme supported by the UE may be the target modulation scheme, and the target modulation scheme is 256QAM. In addition, the number of RBs allocated to the UE may be also a maximum number, of RBs that can be received by the UE, in the downlink parameter, where the maximum number, of RBs that can be received by the UE, in the downlink parameter is the maximum number, of RBs that can be received by the UE when the target modulation scheme is used in downlink transmission, reported by the UE.

For example, if a maximum number, of RBs that can be received by the UE when a 256QAM modulation scheme is used in downlink transmission, reported by the UE is X, where X is an integer from 1 to 110, and the supported highest order modulation scheme reported by the UE is 256QAM, the base station determines that the number Y of RBs allocated to the UE is less than or equal to X. In the method, it can be prevented that the number of RBs allocated to the UE is excessively high to exceed a processing capability of the UE and to cause a demodulation error of the UE.

The method in this embodiment may be applied to a base station, that is, the base station may implement the method.

In the foregoing technical solution, multiple optional implementation manners are introduced on the basis of the first method embodiment, and in all the implementation manners, it can be implemented that after UE supports a higher modulation scheme, a higher modulation scheme feature can be introduced for the UE, so as to improve spectral efficiency.

Figure 11:
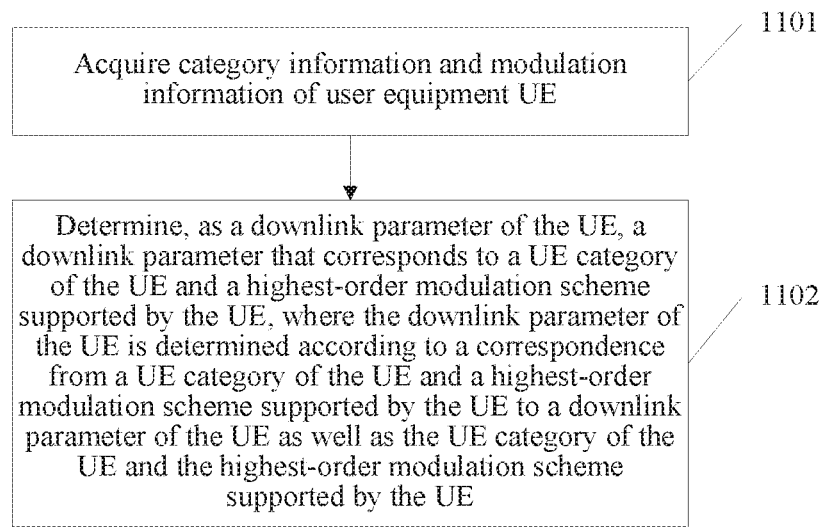
FIG. 11 is a schematic flowchart of another method for determining a downlink parameter according to an embodiment.

Referring to FIG. 11, FIG. 11 is a schematic flowchart of another method for determining a downlink parameter according to an embodiment. As shown in FIG. 11, the method includes.

1101: Acquire category information and modulation information of user equipment UE, where the category information includes a UE category of the UE, and the modulation information includes a highest order modulation scheme supported by the UE.

1102: Determine, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

In addition, the method may further include: reporting the category information and the modulation information to a base station, so that the base station determines, as a downlink parameter of the UE, a downlink parameter that corresponds to the UE category of the UE and the highest order modulation scheme supported by the UE, where the downlink parameter of the UE is determined according to the correspondence from a UE category of the UE and a highest order modulation scheme supported by the UE to a downlink parameter of the UE as well as the UE category of the UE and the highest order modulation scheme supported by the UE.

Optionally, the modulation information may include at least one of the following: information used to represent whether the highest order modulation scheme supported by the UE is a target modulation scheme and a highest order modulation order of a downlink modulation scheme, where the target modulation scheme includes 256 quadrature amplitude modulation QAM or a modulation scheme whose order is higher than 64QAM.

Optionally, step 1102 may include: determining, as a downlink parameter of the UE, a downlink parameter that is of the UE and that corresponds to the UE category of the UE, the highest order modulation scheme supported by the UE, and the maximum number, of layers for spatial multiplexing in downlink, supported by the UE, where the downlink parameter of the UE is determined according to a correspondence from a UE category of the UE, a highest order modulation scheme supported by the UE, and a maximum number, of layers for spatial multiplexing in downlink, supported by the UE to a downlink parameter of the UE as well as the UE category of the UE, the highest order modulation scheme supported by the UE, and the maximum number, of layers for spatial multiplexing in downlink, supported by the UE.

In the implementation manner, in the method, the maximum number, of layers for spatial multiplexing in downlink, supported by the UE may be further acquired.

Optionally, the downlink parameter may include at least one of the following: a maximum number of bits that can be received by the UE within one transmission time interval TTI, where the number of bits is a number of bits of data transmitted in a downlink shared channel DL-SCH transport block, a maximum number of bits, which can be received by the UE within one TTI, of data transmitted in one DL-SCH transport block, a maximum number of bits of data transmitted on a soft channel, and a maximum number of resource blocks RBs that can be received by the UE.

After the reporting the category information and the modulation information to a base station, the method may further include: receiving first configuration information and second configuration information that are sent by the base station, where the first configuration information is used to indicate a downlink transmission mode, and the second configuration information is used to indicate whether the target modulation scheme is supported when downlink transmission is performed with the UE; and calculating a soft buffer size of the DL-SCH transport block according to the UE category of the UE, the downlink transmission mode, the maximum number of bits of data transmitted on a soft channel, and whether the target modulation scheme is supported when downlink transmission is performed with the UE, where the downlink transmission mode includes a transmission mode in which the base station and the UE perform downlink transmission, and the target modulation scheme includes 256 QAM or a modulation scheme whose order is higher than 64QAM.

Optionally, the calculating a soft buffer size of the DL-SCH transport block according to the UE category of the UE, the downlink transmission mode, the maximum number of bits of data transmitted on a soft channel, and whether the target modulation scheme is supported when downlink transmission is performed with the UE includes: calculating the soft buffer size of the DL-SCH transport block by using the following formula:

$$N_{IR} = \left\lfloor \frac{N_{soft}}{K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $K_C$ is a positive real number determined according to whether the target modulation scheme is supported in downlink transmission performed by the base station and the UE, $K_{MIMO}$ is a natural number in a value range from 1 to 2, $M_{DL\_HARQ}$ is a maximum downlink hybrid automatic repeat request HARQ process number, $M_{limit}$ is a predefined positive real number, and $\min(M_{DL\_HARQ}, M_{limit})$ and denotes taking a smaller value of $M_{DL\_HARQ}$ and $M_{limit}$; or calculating the soft buffer size of the DL-SCH transport block by using the following formula:

$$N_{IR} = \left\lfloor \frac{N_{soft}}{\alpha \cdot K_C \cdot K_{MIMO} \cdot \min(M_{DL\_HARQ}, M_{limit})} \right\rfloor$$

where $N_{IR}$ denotes the soft buffer size of the DL-SCH transport block, $N_{soft}$ is a number of soft channel bits that is determined, according to the UE category of the UE and the downlink transmission mode, from the maximum number of bits of data transmitted on a soft channel, $\alpha$ is a predefined positive real number, $K_C$ is a positive real number determined according to whether the target modulation scheme is supported in downlink transmission performed by the base station and the UE, $K_{MIMO}$ is a natural number in a value range from 1 to 2, $M_{DL\_HARQ}$ is a maximum downlink HARQ process number, $M_{limit}$ is a predefined positive real number, and $\min(M_{DL\_HARQ}, M_{limit})$ denotes taking a smaller value of $M_{DL\_HARQ}$ and $M_{limit}$.

Optionally, $K_C$ may be also a received natural number from 1 to 5 that is configured by the base station by using higher layer signaling, or a non-integer from 1 to 5. Certainly, for $K_C$, manners for calculating $K_C$ in the embodiments shown in FIG. 2 and FIG. 3 may be further used to calculate $K_C$, and are not described herein again.

Optionally, the method may further include: establishing a correspondence from a UE category and a highest order modulation scheme to a downlink parameter, and sending the correspondence to the base station; or receiving a correspondence, sent by the base station, from a UE category and a highest order modulation scheme to a downlink parameter.

The correspondence established or received in the implementation manner is the correspondence used in step 402, and the correspondence may specifically include correspondences listed in Table 1 to Table 6.2.

It should be noted that for all the parameters or implementation manners in the implementation steps in this embodiment, refer to the parameters or implementation manners in the embodiments shown in FIG. 1 to FIG. 3, and the parameters or implementation manners are not described herein again.

Optionally, the method may be implemented by the UE, that is, the UE may implement the method.

In the foregoing technical solution, category information and modulation information of user equipment UE are acquired, where the category information includes a UE category of the UE, and the modulation information includes a highest order modulation scheme supported by the UE; and according to a correspondence from a UE category of the UE and a highest order modulation scheme supported by the UE to a downlink parameter of the UE as well as the UE category of the UE and the highest order modulation scheme supported by the UE, a downlink parameter that corresponds to the UE category of the UE and the highest order modulation scheme supported by the UE is determined as a downlink parameter of the UE as a downlink parameter of the UE. In this way, it can be implemented that after UE supports a higher modulation scheme, a downlink parameter of the UE can be determined according to the higher modulation scheme, so that it can be implemented that a modulation feature of the UE is fully used during a process of downlink transmission. In addition, because a feature of a highest order modulation scheme supported by the UE can be introduced in downlink transmission, spectral efficiency in downlink transmission can be improved.

Figure 12:
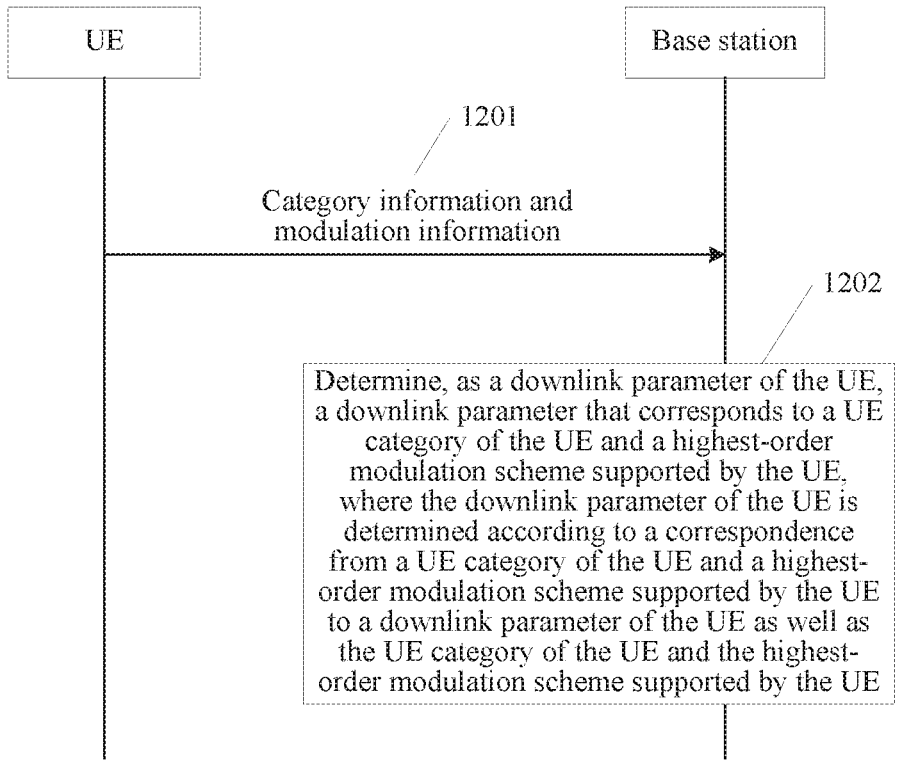
FIG. 12 is a schematic diagram of another method for determining a downlink parameter according to an embodiment.

Referring to FIG. 12, FIG. 12 is a schematic diagram of another method for determining a downlink parameter according to an embodiment. As shown in FIG. 12, the method includes.

1201: UE reports category information and modulation information to a base station, where the category information includes a UE category of the UE, and the modulation information includes a highest order modulation scheme supported by the UE.

1202: The base station determines, as a downlink parameter of the UE, a downlink parameter that corresponds to the UE category of the UE and the highest order modulation scheme supported by the UE, where the downlink parameter of the UE is determined according to a correspondence from a UE category of the UE and a highest order modulation scheme supported by the UE to a downlink parameter of the UE as well as the UE category of the UE and the highest order modulation scheme supported by the UE.

In the foregoing technical solution, it can be implemented that after UE supports a higher modulation scheme, a downlink parameter of the UE can be determined according to the higher modulation scheme, so that it can be implemented that a modulation feature of the UE is fully used during a process of downlink transmission. In addition, because a feature of a highest order modulation scheme supported by the UE can be introduced in downlink transmission, spectral efficiency in downlink transmission can be improved.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM), or the like.

What is disclosed above is merely exemplary embodiments, and certainly is not intended to limit the protection scope. Therefore, equivalent variations made in accordance with the claims of embodiments shall fall within the scope of embodiments.

What is claimed is:

1. A base station comprising:
a receiver, configured to receive category information and modulation information reported by a user equipment (UE), and further configured to receive a maximum number of RBs reported by the UE that can be received by the UE while a target modulation scheme is used in downlink transmission, wherein the category information comprises a UE category of the UE, and wherein the modulation information comprises a highest order modulation scheme that is supported by the UE;
a transmitter;
a processor; and
a non-transitory computer readable storage medium storing a program for execution by the processor, the program including instructions to:
determine a downlink parameter that corresponds to the UE category of the UE and the highest order modulation scheme supported by the UE, wherein the downlink parameter of the UE is determined according to a UE category of the UE and a highest order modulation scheme supported by the UE; and
determine, according to the highest order modulation scheme supported by the UE and the received maximum number of RBs, a number of RBs allocated to the UE, wherein the number of RBs allocated to the UE is less than or equal to the received maximum number of RBs:
wherein the downlink parameter comprises at least the maximum number of resource blocks (RBs) that can be received by the UE; and
wherein the transmitter is configured to send first configuration information and second configuration information to the UE, wherein the first configuration information indicates a downlink transmission mode, wherein the second configuration information indicates whether a target modulation scheme is supported while downlink transmission is performed with the UE.

2. The base station according to claim 1, wherein the modulation information comprises at least one of the following: information used to represent whether the highest order modulation scheme supported by the UE is a target modulation scheme and a highest order modulation order of a downlink modulation scheme, wherein the target modulation scheme comprises 256 quadrature amplitude modulation (QAM) or a modulation scheme having an order higher than 64QAM.

3. The base station according to claim 1:
wherein the receiver is further configured to receive layer number information reported by the UE, wherein the layer number information represents a maximum number of layers for spatial multiplexing in downlink supported by the UE; and
wherein the instructions further comprise instructions to determine, as a downlink parameter of the UE, a downlink parameter of the UE, wherein the downlink parameter corresponds to the UE category of the UE, the highest order modulation scheme supported by the UE, and the maximum number of layers for spatial multiplexing in downlink supported by the UE, and wherein the downlink parameter of the UE is determined according to the UE category of the UE, the highest order modulation scheme supported by the UE, and a maximum number of layers for spatial multiplexing in downlink supported by the UE.

4. The base station according to claim 1, wherein the instructions further comprise instructions
to calculate a soft buffer size of the DL-SCH transport block according to the UE category of the UE, a downlink transmission mode, and a maximum number of bits of data transmitted on a soft channel, wherein the downlink transmission mode comprises a transmission mode in which downlink transmission with the UE is performed.

5. The base station according to claim 1, wherein the UE calculates a soft buffer size of the DL-SCH transport block according to the UE category of the UE, the downlink transmission mode, a maximum number of bits of data transmitted on a soft channel, and whether the target modulation scheme is supported while downlink transmission is performed with the UE.

6. User equipment (UE) comprising:
a receiver;
a processor; and
a non-transitory computer readable storage medium storing a program for execution by the processor, the program including instructions to:
acquire category information and modulation information of the UE, wherein the category information comprises a UE category of the UE, and wherein the modulation information comprises a highest order modulation scheme that is supported by the UE; and
determine, as a downlink parameter of the UE, a downlink parameter corresponding to the UE category of the UE and the highest order modulation scheme supported by the UE, wherein the downlink parameter of the UE is determined according to the UE category of the UE and the highest order modulation scheme supported by the UE;
wherein the downlink parameter comprises at least a maximum number of resource blocks (RBs) that can be received by the UE while a target modulation scheme is used in downlink transmission; and
wherein the receiver is configured to receive first configuration information and second configuration information sent by a base station, wherein the first configuration information indicates a downlink transmission mode for transmission from the base station to the UE according to a number of RB blocks allocated to the UE by the base station according to the highest order modulation scheme supported by the UE and the received maximum number of RBs, wherein the number of RBs allocated to the UE is less than or equal to the maximum number of RBs; and wherein the second configuration information indicates whether a target modulation scheme is supported when downlink transmission is performed with the UE.

7. The UE according to claim 6, wherein the UE further comprises a transmitter, wherein the instructions to report the category information and modulation information include instructions to cause the transmitter to report the category information and the modulation information to the base station, wherein the base station determines, as a downlink parameter of the UE, a downlink parameter corresponding to the UE category of the UE and the highest order modulation scheme supported by the UE, wherein the downlink parameter of the UE is determined according to the UE category of the UE and the highest order modulation scheme supported by the UE.

8. The UE according to claim 6, wherein the modulation information comprises at least one of the following:
information representing whether the highest order modulation scheme supported by the UE is a target modulation scheme and a highest order modulation order of a downlink modulation scheme, wherein the target modulation scheme comprises 256 quadrature amplitude modulation QAM or a modulation scheme having an order higher than 64QAM.

9. The UE according to claim 6, wherein the instructions further comprise instructions to determine, as a downlink parameter of the UE, a downlink parameter of the UE corresponding to the UE category of the UE, the highest order modulation scheme supported by the UE, and a maximum number of layers for spatial multiplexing in downlink supported by the UE, wherein the downlink parameter of the UE is determined according to the UE category of the UE, the highest order modulation scheme supported by the UE, and the maximum number of layers for spatial multiplexing in downlink supported by the UE.

10. The UE according to claim 6, wherein the instructions further comprise instructions to calculate a soft buffer size of the DL-SCH transport block according to the UE category of the UE, the downlink transmission mode, a maximum number of bits of data transmitted on a soft channel, and whether the target modulation scheme is supported when downlink transmission is performed with the UE, wherein the downlink transmission mode is a transmission mode in which the base station and the UE perform downlink transmission, and wherein the target modulation scheme comprises 256 quadrature amplitude modulation (QAM) or a modulation scheme having an order higher than 64QAM.

11. A method comprising:
receiving category information and modulation information reported by a user equipment (UE), wherein the category information comprises a UE category of the UE, and wherein the modulation information comprises a highest order modulation scheme that is supported by the UE;
receiving a maximum number of RBs that can be received by the UE while a target modulation scheme is used in downlink transmission, reported by the UE;
determining a downlink parameter of the UE corresponding to the UE category of the UE and the highest order modulation scheme supported by the UE, wherein the downlink parameter of the UE is determined according to the UE category of the UE and the highest order modulation scheme supported by the UE, wherein the downlink parameter comprises at least the maximum number of resource blocks (RBs) that can be received by the UE;
determining, according to the highest order modulation scheme supported by the UE and the received maximum number of RBs, a number of RBs allocated to the UE, wherein the number of RBs allocated to the UE is less than or equal to the received maximum number of RBs; and
sending first configuration information and second configuration information to the UE, wherein the first configuration information indicates a downlink transmission mode, wherein the second configuration information indicates whether a target modulation scheme is supported while downlink transmission is performed with the UE.

12. The method according to claim 11, wherein the modulation information comprises at least one of the following:
information representing whether the highest order modulation scheme supported by the UE is a target modulation scheme and a highest order modulation order of a downlink modulation scheme, wherein the target modulation scheme comprises 256 quadrature amplitude modulation (QAM) or a modulation scheme having an order higher than 64QAM.

13. The method according to claim 11, wherein before the determining, as a downlink parameter of the UE, a downlink parameter corresponding to the UE category of the UE and the highest order modulation scheme supported by the UE, wherein the downlink parameter of the UE is determined according to the UE category of the UE and the highest order modulation scheme supported by the UE, the method further comprising:
   receiving layer number information reported by the UE, wherein the layer number information represents a maximum number of layers for spatial multiplexing in downlink supported by the UE; and
   wherein determining the downlink parameter corresponding to the UE category of the UE and the highest order modulation scheme supported by the UE comprises determining the downlink parameter of the UE corresponding to the UE category of the UE and the highest order modulation scheme supported by the UE, and the maximum number of layers for spatial multiplexing in downlink supported by the UE.

14. The method according to claim 11, further comprising:
   calculating a soft buffer size of the DL-SCH transport block according to the UE category of the UE, a downlink transmission mode, and a maximum number of bits of data transmitted on a soft channel, after determining the downlink parameter corresponding to the UE category of the UE and the highest order modulation scheme supported by the UE, wherein the downlink transmission mode comprises a transmission mode in which downlink transmission with the UE is performed.

15. The method according to claim 14, wherein calculating the soft buffer size of the DL-SCH transport block according to the UE category of the UE, the downlink transmission mode, and the maximum number of bits of data transmitted on the soft channel comprises:

calculating the soft buffer size of the DL-SCH transport block by using the following formula:

$$N_{IR} = \left\lfloor \frac{N_{soft}}{K_C \cdot K_{MIMO} \cdot \min(M_{DL\_HARQ}, M_{limit})} \right\rfloor,$$

wherein $N_{IR}$ is the soft buffer size of the DL-SCH transport block, $N_{soft}$ is a number of soft channel bits that is determined, according to the UE category of the UE and the downlink transmission mode, from the maximum number of bits of data transmitted on a soft channel, $K_C$ is a positive real number, $K_{MIMO}$ is a natural number in a value range from 1 to 2, $M_{DL\_HARQ}$ is a maximum downlink hybrid automatic repeat request (HARQ) process number, $M_{limit}$ is a predefined positive real number, and $\min(M_{DL\_HARQ}, M_{limit})$ denotes taking a smaller value of $M_{DL\_HARQ}$ and $M_{limit}$; or calculating the soft buffer size of the DL-SCH transport block by using the following formula:

$$N_{IR} = \left\lfloor \frac{N_{soft}}{\alpha \cdot K_C \cdot K_{MIMO} \cdot \min(M_{DL\_HARQ}, M_{limit})} \right\rfloor,$$

wherein $N_{IR}$ is the soft buffer size of the DL-SCH transport block, $N_{soft}$ is a number of soft channel bits that is determined, according to the UE category of the UE and the downlink transmission mode, from the maximum number of bits of data transmitted on a soft channel, $\alpha$ is a predefined positive real number, $K_C$ is a positive real number, $K_{MIMO}$ is a natural number in a value range from 1 to 2, $M_{DL\_HARQ}$ is a maximum downlink HARQ process number, $M_{limit}$ is a predefined positive real number, and $\min(M_{DL\_HARQ}, M_{limit})$ denotes taking a smaller value of $M_{DL\_HARQ}$ and $M_{limit}$.

* * * * *